United States Patent
Deem et al.

(10) Patent No.: US 7,685,561 B2
(45) Date of Patent: Mar. 23, 2010

(54) STORAGE API FOR A COMMON DATA PLATFORM

(75) Inventors: Michael E. Deem, Redmond, WA (US); Benjamin Albahari, Seattle, WA (US); Ramesh Nagarajan, Seattle, WA (US); Michael J. Pizzo, Bellevue, WA (US); Arthur T. Whitten, Redmond, WA (US); Edward G. Sheppard, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1236 days.

(21) Appl. No.: 11/195,320

(22) Filed: Aug. 2, 2005

(65) Prior Publication Data

US 2006/0195477 A1    Aug. 31, 2006

Related U.S. Application Data

(60) Provisional application No. 60/657,522, filed on Feb. 28, 2005.

(51) Int. Cl.
G06F 9/44    (2006.01)
(52) U.S. Cl. .................................................. 717/104
(58) Field of Classification Search .................. 717/104
See application file for complete search history.

(56) References Cited

U.S. PATENT DOCUMENTS

| | | | |
|---|---|---|---|
| 5,449,293 A | 9/1995 | Chang et al. | |
| 5,576,954 A | 11/1996 | Driscoll | |
| 5,717,913 A | 2/1998 | Driscoll | |
| 5,724,575 A | 3/1998 | Hover et al. | |
| 5,995,969 A | 11/1999 | Lee et al. | |
| 6,128,624 A | 10/2000 | Papierniak et al. | |
| 6,175,837 B1 | 1/2001 | Sharma et al. | |
| 6,341,277 B1 | 1/2002 | Coden et al. | |
| 6,341,289 B1 | 1/2002 | Burroughs et al. | |

(Continued)

FOREIGN PATENT DOCUMENTS

EP    1 457 907 A    9/2004

(Continued)

OTHER PUBLICATIONS

EG OA dated Feb. 11, 2009 for EG Application No. 72/2006, 1 page.

(Continued)

*Primary Examiner*—Wei Y Zhen
*Assistant Examiner*—Junchun Wu
(74) *Attorney, Agent, or Firm*—Workman Nydegger

(57) ABSTRACT

An application program interface (API) for a data platform. The API includes a generic data access component that exposes at least one of stores, sessions, transactions, and query services of the data platform, which data platform is associated with a data store. A data classes component of the API provides canonical, application-independent classes that expose types and relationships of a data model of the data platform. The API includes a domain data classes component of application-specific and framework-specific classes that expose domain-specific properties and behaviors of the data platform. The data platform can be a common data platform that interfaces to the data store to provide data services accessible by a plurality of disparate application frameworks, which data services allow a corresponding application of the different frameworks to access the data store.

16 Claims, 15 Drawing Sheets

U.S. PATENT DOCUMENTS

| | | | |
|---|---|---|---|
| 6,556,983 | B1 | 4/2003 | Altschuler et al. |
| 6,591,275 | B1 | 7/2003 | Russell et al. |
| 6,609,133 | B2 | 8/2003 | Ng et al. |
| 6,735,593 | B1 | 5/2004 | Williams |
| 6,836,777 | B2 | 12/2004 | Holle |
| 6,847,980 | B1 | 1/2005 | Benitez et al. |
| 7,054,877 | B2 | 5/2006 | Dettinger et al. |
| 7,058,655 | B2 | 6/2006 | Goldberg et al. |
| 7,062,502 | B1 | 6/2006 | Kesler |
| 7,096,216 | B2 | 8/2006 | Anonsen |
| 7,158,994 | B1 | 1/2007 | Smith et al. |
| 7,162,721 | B2 | 1/2007 | Ali et al. |
| 2001/0047372 | A1 | 11/2001 | Gorelik et al. |
| 2003/0004964 | A1 | 1/2003 | Cameron et al. |
| 2003/0005019 | A1 | 1/2003 | Pabla et al. |
| 2003/0046266 | A1 | 3/2003 | Mullins et al. |
| 2003/0105732 | A1 | 6/2003 | Kagalwala et al. |
| 2003/0200533 | A1 | 10/2003 | Roberts et al. |
| 2003/0217128 | A1 | 11/2003 | Yanosy |
| 2003/0229640 | A1 | 12/2003 | Carlson et al. |
| 2004/0006549 | A1 | 1/2004 | Mullins et al. |
| 2004/0015474 | A1 | 1/2004 | Anonsen et al. |
| 2004/0015488 | A1 | 1/2004 | Anonsen et al. |
| 2004/0015489 | A1 | 1/2004 | Anonsen et al. |
| 2004/0015509 | A1 | 1/2004 | Anonsen et al. |
| 2004/0015814 | A1 | 1/2004 | Trappen et al. |
| 2004/0205303 | A1 | 10/2004 | Naveh et al. |
| 2005/0027675 | A1 | 2/2005 | Schmitt et al. |
| 2005/0027720 | A1 | 2/2005 | Schmitt |
| 2005/0027732 | A1 | 2/2005 | Kalima |
| 2005/0044089 | A1 | 2/2005 | Wu et al. |
| 2005/0050054 | A1* | 3/2005 | Clark et al. ............... 707/100 |
| 2005/0097108 | A1 | 5/2005 | Wang et al. |
| 2005/0097187 | A1 | 5/2005 | Thompson et al. |
| 2005/0138052 | A1 | 6/2005 | Zhou et al. |
| 2005/0149555 | A1 | 7/2005 | Wang et al. |
| 2005/0149907 | A1 | 7/2005 | Seitz et al. |
| 2005/0267901 | A1* | 12/2005 | Irlen ....................... 707/100 |
| 2006/0184568 | A1 | 8/2006 | Barcia |
| 2006/0195460 | A1 | 8/2006 | Nori et al. |
| 2006/0195476 | A1 | 8/2006 | Nori et al. |
| 2006/0195477 | A1 | 8/2006 | Deem et al. |
| 2007/0266041 | A1 | 11/2007 | Beckman et al. |

FOREIGN PATENT DOCUMENTS

| | | |
|---|---|---|
| EP | 001457907 A | 9/2004 |
| WO | 02099702 A | 12/2002 |
| WO | WO 02/099702 A | 12/2002 |
| WO | 2004095312 A | 11/2004 |
| WO | WO 2004/095312 A1 | 11/2004 |
| WO | 2004107205 A | 12/2004 |
| WO | 2004107206 A | 12/2004 |
| WO | WO 2004/107205 A | 12/2004 |
| WO | WO 2004/107206 A | 12/2004 |

OTHER PUBLICATIONS

CN OA dated Aug. 15, 2008 for CN Application No. 200610004388. 8, 9 pages.

OA dated Dec. 10, 2008 for U.S. Appl. No. 11/468,008, 43 pages.

Chen, et al. "Turning Relational DBMS into Nested Relational DBMS" (2005) 12 pages.

CiteSeer. evidence for Chen reference, 2004.

"DB Interface Module User;s Guide" (2005) Rogue Wave, Section 7.4 https://www2.rougewave.com/support/docs/sourcepro/edition8/htm:/dcoore/7-4.html 12 pages.

Blakely. "Data Access for the Masses through OLE DB" ACM 1996, pp. 161-172.

European Search Report dated Mar. 21, 2007 for European Patent Application Serial No. EP 06 10 0768, 2 Pages.

Mittal, et al., A Framework for eGovernace Solutions, Sep./Nov. 2004, vol. 48, 17 pages International Business Machines Corporation.

Davis, et al., Understanding Services for Integration Management, Department of Mathematical and Computer Sciences, The University of Tulsa, pp. 84-93, Springer-Verlag Berlin Heidelberg 2004.

Acharya, et al., Discovering and Using Web Services in M-Commerce, SCE Computer Networking, University of Missouri-Kansas City, 2004, pp. 136-151, Springer-Verlag Berlin Heidelberg 2005.

European Search Report dated Apr. 11, 2007 for European Patent Application Serial No. EP 06 10 1151, 2 Pages.

Australian Patent Office Search Report dated Apr. 27, 2007 for Australian Patent Application Serial No. SG 200508626-9, 3 Pages.

Distibuted Management Task Force DMTF: "CIM Database Model White Paper" CIM Version 2.8, Nov. 3, 2003, pp. 1-56, retrieved from http://web.archive.org/web/20040414223542/www.dmtf.org/standards/ published_documents/DSP0133.pdf, last accessed on Jun. 21, 2006.

Gwyn Cole, et al. "A Guided Tour of the Common Information Model Repository", Jan. 10, 2003, 16 pages, retrieved from http://www.informit.com/articles//printerfriendly.asp?p=30482&r1=1>, last accessed on Jun. 21, 2006.

European Search Report dated Jul. 6, 2006 for European Patent Application Serial No. EP 06 10 1024, 3 pages.

Ambler. "Mapping Objects to Relational Databases: O/R Mapping in Detail," (31 Pages).

Bernes-Lee, et al. Uniform Resource Identifiers(URI) : Generic Syntax, The nternet Society , Aug. 1998, 40 pages.

Chen. "The Entity-Relationship Model—Towards a Unified View of Data" ACM Transactions on Database Systems, vol. 1, Issue 1, Mar. 1976, pp. 9-36.

EdgeXtend Technology Overview, (4 pages).

OA Dated Aug. 8, 2008 for U.S. Appl. No. 11/550,574, 30 pages.

Site Dock: Product Overview, Copyright 2002-2003 William. (2 Pages).

Svirskas, et al. "An Approach for Solving Java Object Persistence Issues using RDBMS and other Data Sources," Department of Computer Science, Faculty of Mathematics and Informatics, Vilnius University, (15 Pages).

Visual Paradigm for UML Enterprise Edition, (2 pages).

Ware, et al. "O/R Mapped Object Persistence Is the Boon" (13 pages).

European Search Report for European Patent No. EP 06 10 0768 dated Mar. 22, 2007, 10 pgs.

* cited by examiner

STORAGE API FOR A COMMON DATA PLATFORM

This application claims the benefit of U.S. Provisional Patent Application Ser. No. 60/657,522 entitled "STORAGE API FOR A COMMON DATA PLATFORM" and filed Feb. 28, 2005. This application is related to U.S. Provisional Patent Application Ser. No. 60/657,556 entitled "PLATFORM FOR DATA SERVICES ACROSS DISPARATE APPLICATION FRAMEWORKS" and filed Feb. 28, 2005, U.S. patent application Ser. No. 11/171,905 entitled "PLATFORM FOR DATA SERVICES ACROSS DISPARATE APPLICATION FRAMEWORKS" and filed Jun. 30, 2005, U.S. Provisional Patent Application Ser. No. 60/657,295 entitled "DATA MODEL FOR OBJECT-RELATIONAL DATA" filed on Feb. 28, 2005, and U.S. patent application Ser. No. 11/228,731 entitled "DATA MODEL FOR OBJECT-RELATIONAL DATA" and filed Sep. 16, 2005. The entireties of the above-noted application are incorporated by reference herein.

BACKGROUND

Data has become an important asset in almost every application, whether it is a Line-of-Business (LOB) application framework utilized for browsing products and generating orders, or a Personal Information Management (PIM) end-user application used for scheduling a meeting between people. Applications perform both data access/manipulation and data management operations on the application data. Typical application operations query a collection of data, fetch the result set, execute some application logic that changes the state of the data, and finally, persists the data to the storage medium.

Traditionally, client/server applications relegated the query and persistence actions to database management systems (DBMS), deployed in the data tier. If there is data-centric logic, it is coded as stored procedures in the database system. The database system operated on data in terms of tables and rows, and the application, in the application tier, operated on the data in terms of programming language objects (e.g., Classes and Structs). The mismatch in data manipulation services (and mechanisms) in the application and the data tiers was tolerable in the client/server systems. However, with the advent of the web technology (and Service Oriented Architectures) and with wider acceptance of application servers, applications are becoming multi-tier, and more importantly, data is now present in every tier.

In such tiered application architectures, data is manipulated in multiple tiers. In addition, with hardware advances in addressability and large memories, more data is becoming memory resident. Applications are also dealing with different types of data such as objects, files, and XML (eXtensible Markup Language) data, for example.

In such hardware and software environments, the need for rich data access and manipulation services, well-integrated with the programming environments, is increasing. One conventional implementation introduced to address the aforementioned problems is a data platform. The data platform provides a collection of services (mechanisms) for applications to access, manipulate, and manage data that is well integrated with the application programming environment. However, such a conventional architecture falls short in many respects. Some key requirements for such a data platform include complex object modeling, rich relationships, the separation of logical and physical data abstractions, query rich data model concepts, active notifications, better integration with middle-tier infrastructure. Thus, there is a substantial unmet need in the art for an improved data platform.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The innovation disclosed and claimed herein, in one aspect thereof, comprises an application program interface (API) for a data platform. The API includes a generic data access component that exposes at least one of stores, sessions, transactions, and query services of the data platform, which data platform is associated with a data store. A data classes component of the API provides canonical, application-independent classes that expose types and relationships of a data model of the data platform. The API includes a domain data classes component of application-specific and framework-specific classes that expose domain-specific properties and behaviors of the data platform. The data platform can be a common data platform that interfaces to the data store to provide data services accessible by a plurality of disparate application frameworks, which data services allow a corresponding application of the different frameworks to access the data store.

In another aspect, the API includes five core classes. A TableSet class can be generated from a data model schema and provides strongly typed access to tables defined within the schema. A StorageDomain class defines the store over which the rest of the classes operate. A StorageContext class provides a context for the session. The StorageContext class defines the scope for identity management, change tracking and concurrency conflict handling, with methods for refreshing or saving changes to objects within the current context. StorageSearcher classes are used to build composable object-based queries against the data store. A StorageView class provides a rich application view over a set of results. StorageView classes support operations such as filtering, sorting, scrolling, grouping, sectioning, expanding/collapsing sections, etc.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
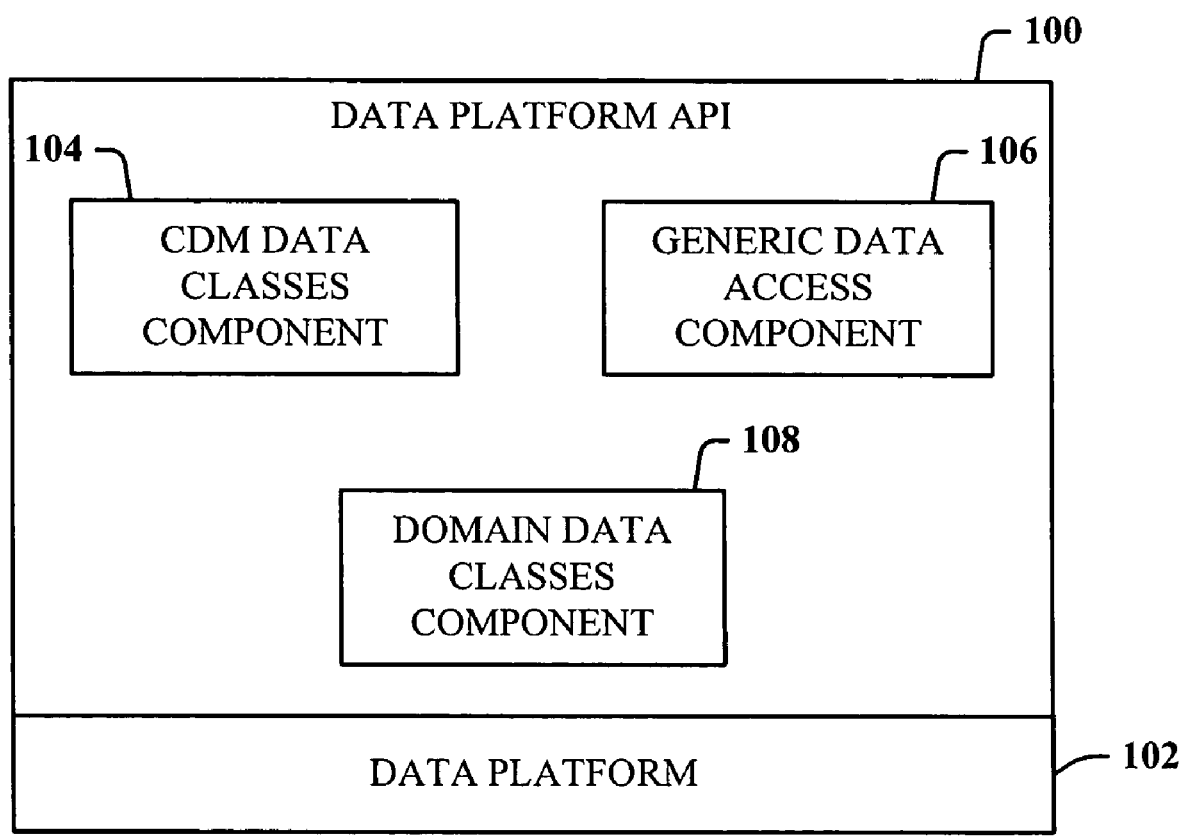
FIG. 1 illustrates a storage application program interface (API) of a data platform in accordance with an innovative aspect.

The innovation is now described with reference to the drawings, wherein like reference numerals are used to refer to like elements throughout. In the following description, for purposes of explanation, numerous specific details are set forth in order to provide a thorough understanding thereof. It can be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

A novel common data platform (CDP) is comprised of a common data model (CDM) that describes objects and how they are related, and a persistent store and services for working with in-memory representations of those objects. The CDP provides an innovative platform for working with persistent data as application objects. The CDP includes a novel application programming interface (API) that is custom tailored to the underlying data model and services defined as part of the platform. The functionality of the CDP is exposed through a set of classes. The definition of those classes, including their public members (e.g., methods and properties) comprises the API for working with the objects within the CDP.

Referring initially to the drawings, FIG. 1 illustrates a storage API 100 of a data platform 102 (e.g., the CDP) in accordance with an innovative aspect. The API 100 provides the programming interface for applications using the data platform (e.g., the CDP) in the form of classes, interfaces, and static helper functions. Database programming language integration (e.g., C# sequence operators) is also part of this API layer. In support thereof, the API 100 includes a CDM data classes component 104 which is a set of canonical, application-independent classes that expose CDM concepts such as Entity, Relationship, Extension, etc. A generic data access component 106 is provided as part of the API 100 to expose stores, sessions, transactions (e.g., StorageContext), query services (e.g., StorageSearcher), and CRUD services (e.g., SaveChanges). CRUD (Create, Retrieve, Update, and Delete) services are the basic processes that are applied to data. The API 100 also includes a domain data classes component 108 which are application/framework-specific classes such as Contact, Message, PurchaseOrders that conform to the CDM, but expose domain-specific properties and behaviors.

Figure 2:
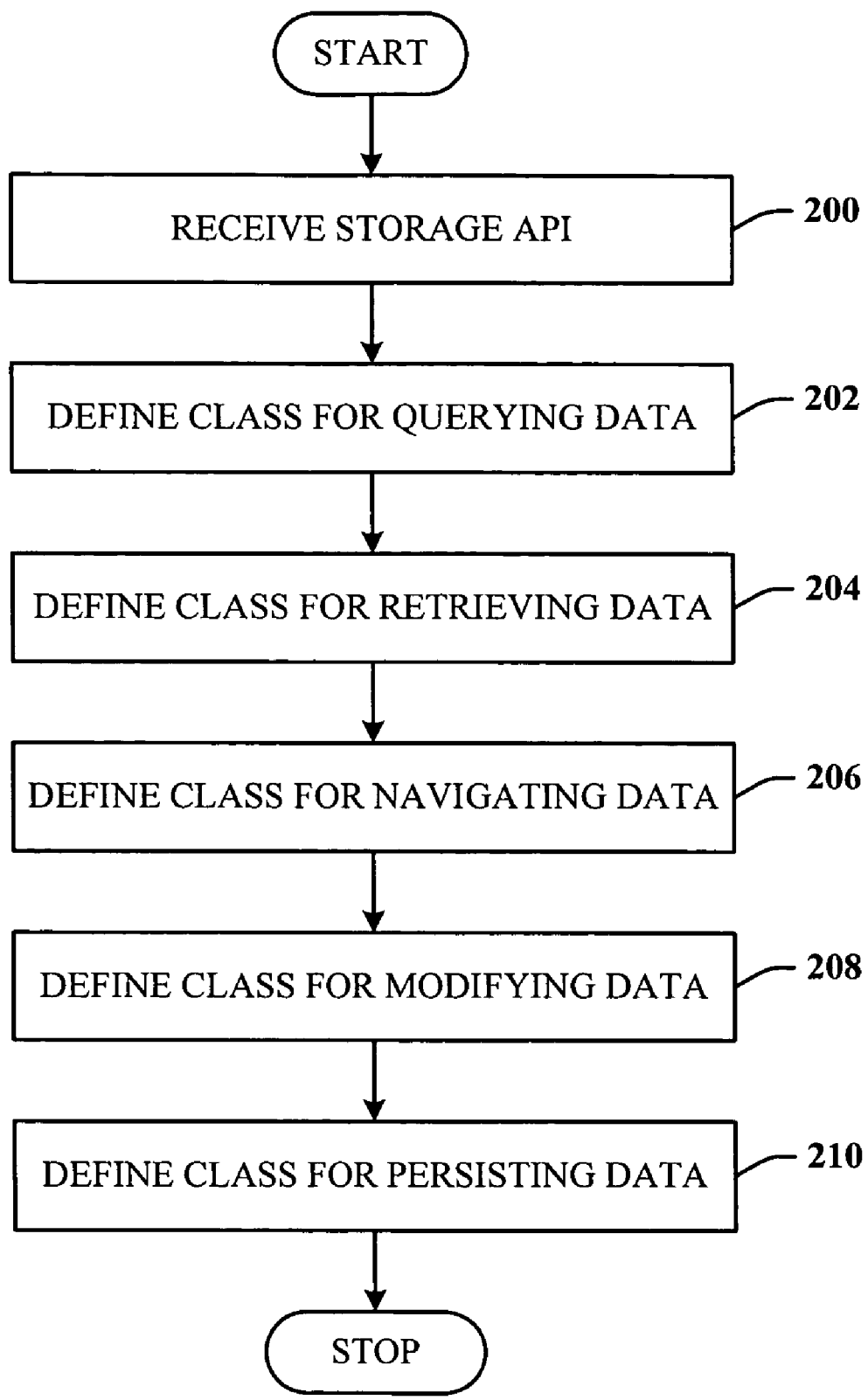
FIG. 2 illustrates a methodology providing a storage API according to a disclosed aspect.

FIG. 2 illustrates a methodology providing a storage API according to a disclosed aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. At 200, a storage API is received. At 202, the API defines a class for querying data. At 204, the API defines a class for retrieving data. At 206, the API defines a class for navigating data. At 208, the API defines a class for modifying data. At 210, the API defines a class for persisting data.

Figure 3:
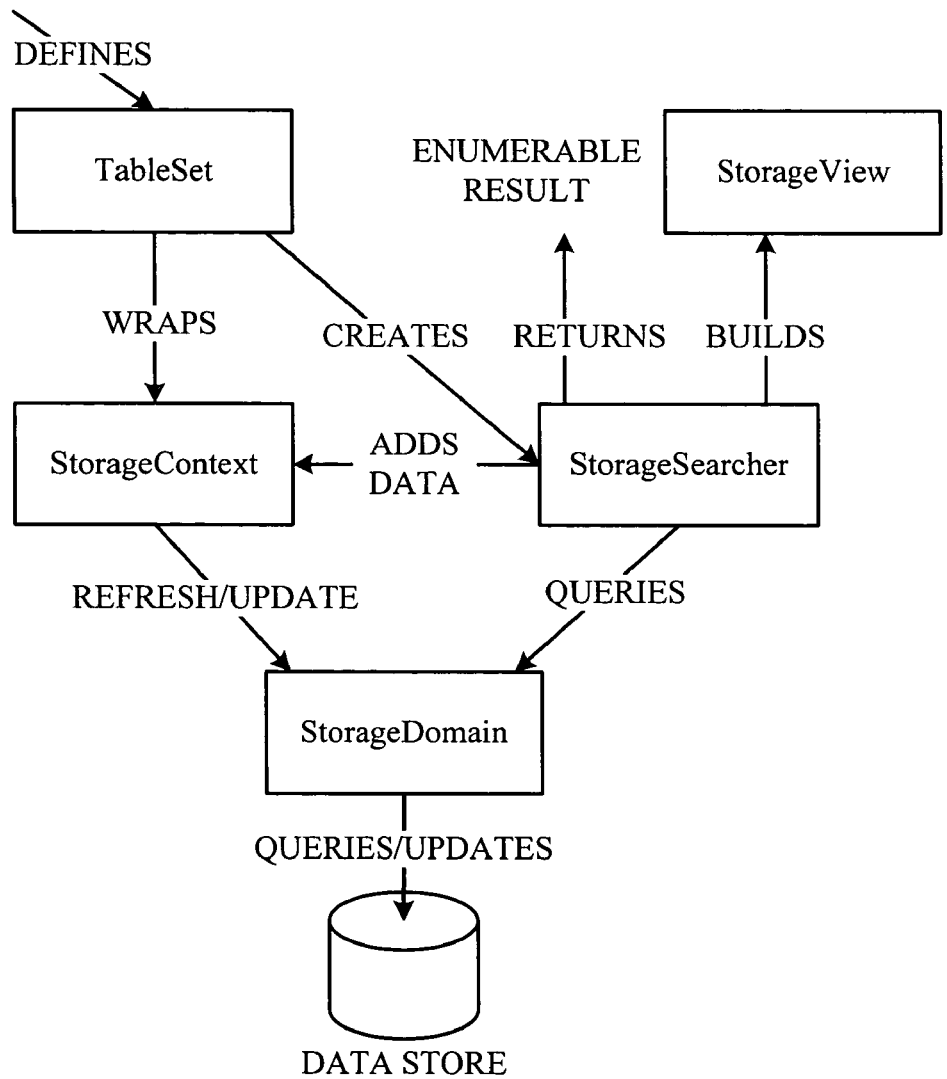
FIG. 3 illustrates a more detailed diagram of the generic data access component of a storage API.

FIG. 3 illustrates a more detailed diagram of the generic data access component 106. The API 300 defines a factoring of the functionality into classes and methods that are easy to use, extensible, powerful, and composable. The storage API 300 defines classes for querying, retrieving, navigating, modifying, and persisting changes to data conforming to a common data model. The storage API 300 separates this query, navigation, and persistence functionality from functionality defined in prescriptive data classes queried, navigated, and persisted by the storage API 300.

The storage API 300 consists of the following core classes and FIG. 3, illustrates the relationships between the StorageDomain, StorageContext, TableSet, StorageSearcher and StorageView. Additional classes can be defined in support of these core classes.

TableSet—A TableSet class can be generated from a data model schema and provides strongly typed access to tables defined within the schema. A TableSet instance wraps one or more StorageContext instances, and uses the underlying StorageContext class and associated StorageDomain class for querying, navigating and updating the objects. Additional methods can be added to the generated TableSet class for schema-specific or framework-specific functionality.

StorageDomain—A class that defines the store over which the rest of the classes operate. Different types of stores implement their own specific StorageDomain classes. The StorageDomain may be used directly, or in conjunction with a TableSet.

StorageContext—A class that provides a context for the session. The StorageContext class defines the scope for identity management, change tracking and concurrency conflict handling, with methods for refreshing or saving changes to objects within the current context. The StorageContext class uses a StorageDomain class in order to communicate with the store (for example, in refreshing data or persisting changes). The StorageContext may be used directly, or in conjunction with a TableSet.

StorageSearcher—StorageSearcher classes are used to build composable object-based queries against the data store. The StorageSearcher class generates a StorageExpression class which is executed by a StorageDomain, typically within a StorageContext. The StorageSearcher supports enumerating results in a forward-only, streamed fashion, or construction of a rich, scrollable StorageView.

StorageView—A StorageView class provides a rich application view over a set of results. StorageViews support operations such as filtering, sorting, scrolling, grouping, sectioning, expanding/collapsing sections, etc.

Figure 4:
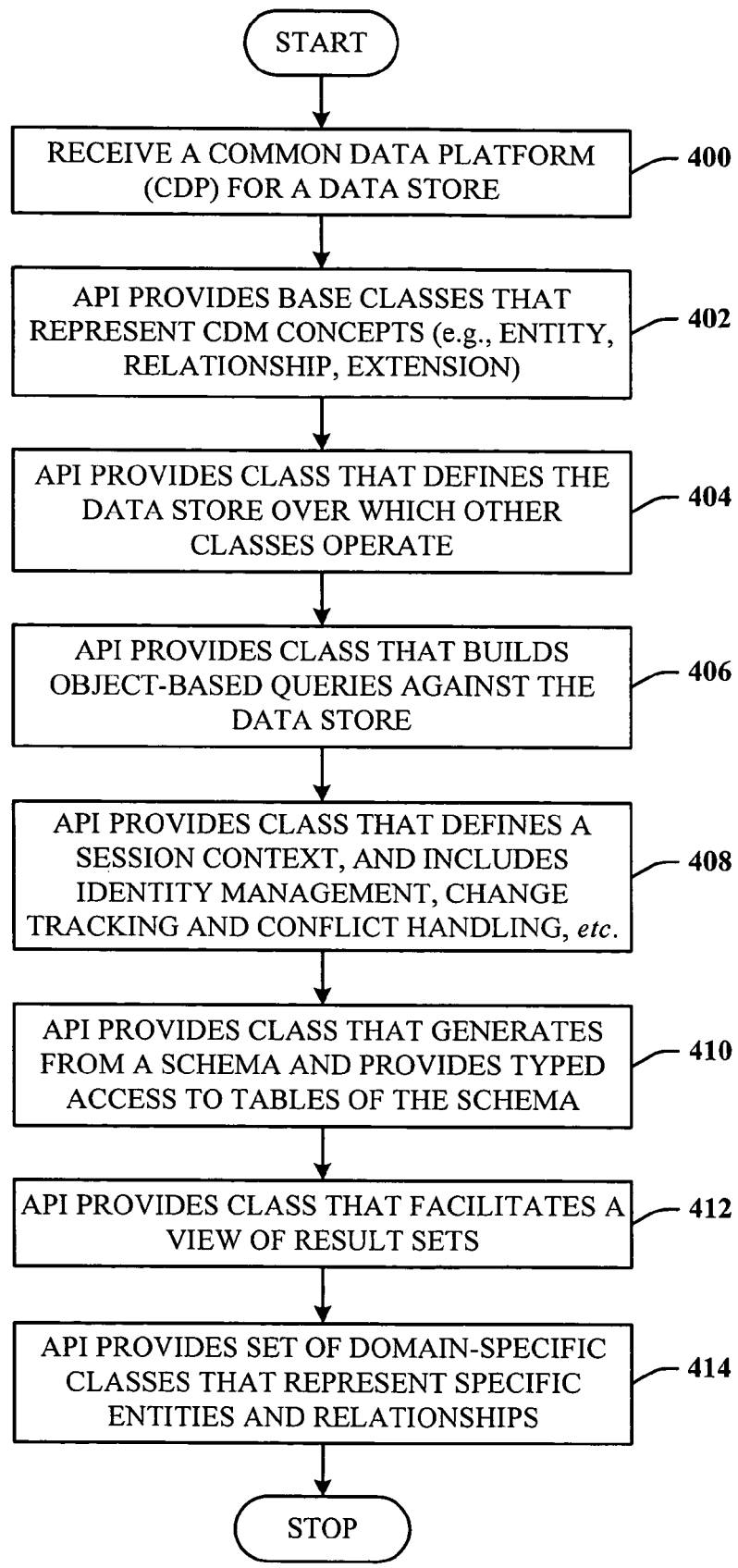
FIG. 4 illustrates a methodology of providing a storage API for a data model.

Referring now to FIG. 4, there is illustrated a methodology of providing a storage API for a data model. At 400, a data platform (e.g., a CDP) is received for utilization over a data store. At 402, an API is provided that includes base classes which represent CDM concepts such as for example, entity, relationship, extension. Underlying functionality of the data platform can be exposed to overlying applications and application frameworks via common CDM data classes defined in the API of the subject invention. At 404, a class is provided that defines the data store over which other API classes operate. At 406, a class is provided which is used to build object-based queries against the data store. At 408, a class is provided that defines a session context, and includes identity management, change tracking, conflict handling, etc. At 410, a class is provided that generates from a schema and provides typed access to tables of the schema. At 412, a class is provided that facilitates a view of the result set(s). At 414, a set of domain-specific classes are defined in order to represent the specific entities and relationships described by an instance of a CDM schema.

The following sections detail the class and member definitions that make up the API for a common data model.

StorageDomain Class. The StorageDomain class is used to encapsulate store information, such as server, authentication, mapping, and so forth. A base storage domain class is derived from for each type of store to provide store-specific information. The base StorageDomain type can be defined as follows:

```
public abstract class StorageDomain : IDisposable
{ }
```

WinFSDomain Class. An example of a StorageDomain against a WinFS store can look like the following:

```
public class WinFSDomain : StorageDomain
{
    public WinFSDomain( );
```

-continued

```
    public WinFSDomain(string share);
}
```

A WinFSDomain constructor can take information to specify the store and scope within the store, for example, through a UNC (universal naming convention) share name. Alternatively, a default constructor can use default store information, for example, to the root of the default store. The UNC is a standard for identifying servers, printers and other resources in a network, which originated in the UNIX community. A UNC path uses double slashes or backslashes to precede the name of the computer.

SqlStorageDomain Class. An example of a StorageDomain against a relational store (e.g., SQL database) can look like the following:

```
public class SqlStorageDomain : StorageDomain
{
    public SqlStorageDomain( );
    public SqlStorageDomain(String connectionString);
    public SqlStorageDomain(SqlConnection connection, String
        mappingFile);
    public SqlStorageDomain(SqlConnection connection,
        IRelationalMapping mapping);
}
```

The SqlStorageDomain constructor can take connection information, for example, in the form of a connection string containing connection and mapping information, or a named configuration containing such information. Alternatively, the constructor can take a connection object along with mapping information in the form of a mapping file or an object that implements a standard mapping interface. Alternatively, a default constructor may use default connection or mapping information, for example from a configuration file.

Figure 5:
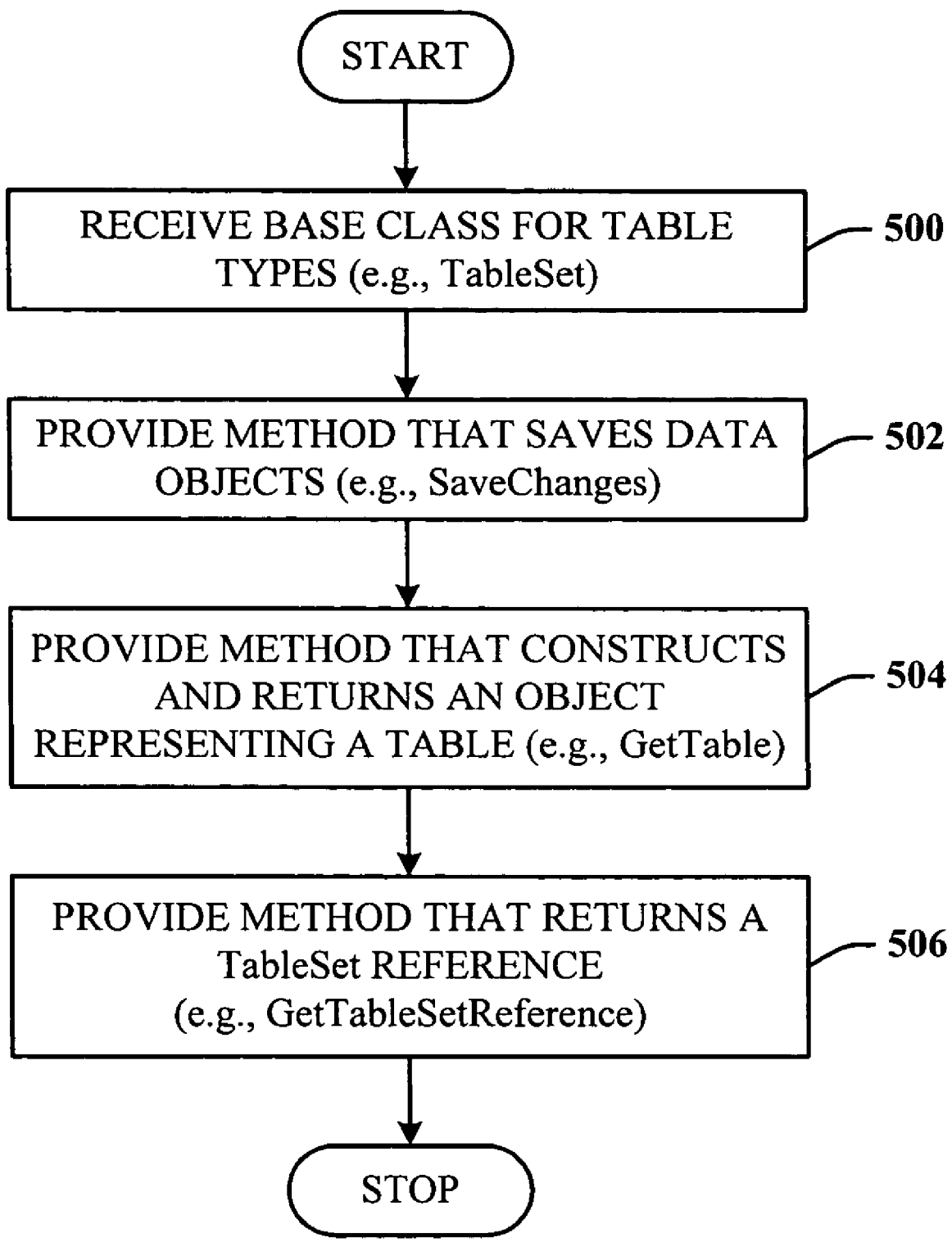
FIG. 5 illustrates a methodology of exposing table set types.

FIG. 5 illustrates a methodology of exposing table set types. At 500, a base class is received for table types. A TableSet class is used as the base class for table set types. Instances of this type can also be created and used directly by an application, if desired. The base TableSet type has the following members:

```
public class TableSet : IDisposable
{
    public TableSet( StorageContext context, string tableSetName );
    public TableSet( StorageDomain domain, string tableSetName );
    public TableSet( StateManager manager, string tableSetName);
    public void Dispose( );
    public StorageContext Context { get; }
    public string Name { get; }
    public Table<T> GetTable<T>(string propertyName);
    public object GetTableSetReference(string propertyName);
    public void SaveChanges( );
}
```

A TableSet is generally constructed with the name of the set of tables within the Schema. Alternatively, the set of tables within the schema can be determined through an alternate mechanism, for example through default naming, a configuration file, etc. A StorageContext can be provided to the TableSet in order to associate the TableSet with an existing StorageContext. Alternatively, a StorageDomain can be provided to the TableSet to associate the TableSet with a StorageDomain. Alternatively still, the TableSet can be provided a common state manager.

At 502, a SaveChanges method can be provided to save the data objects associated with the table set. An asynchronous version of this method may also be provided. At 504, a GetTable method can be provided for constructing and returning an object representing a table in schema (e.g., a Table<T>) based on the name provided. At 506, a GetTableSetReference method can be provided to return a TableSetReference.

Figure 6:
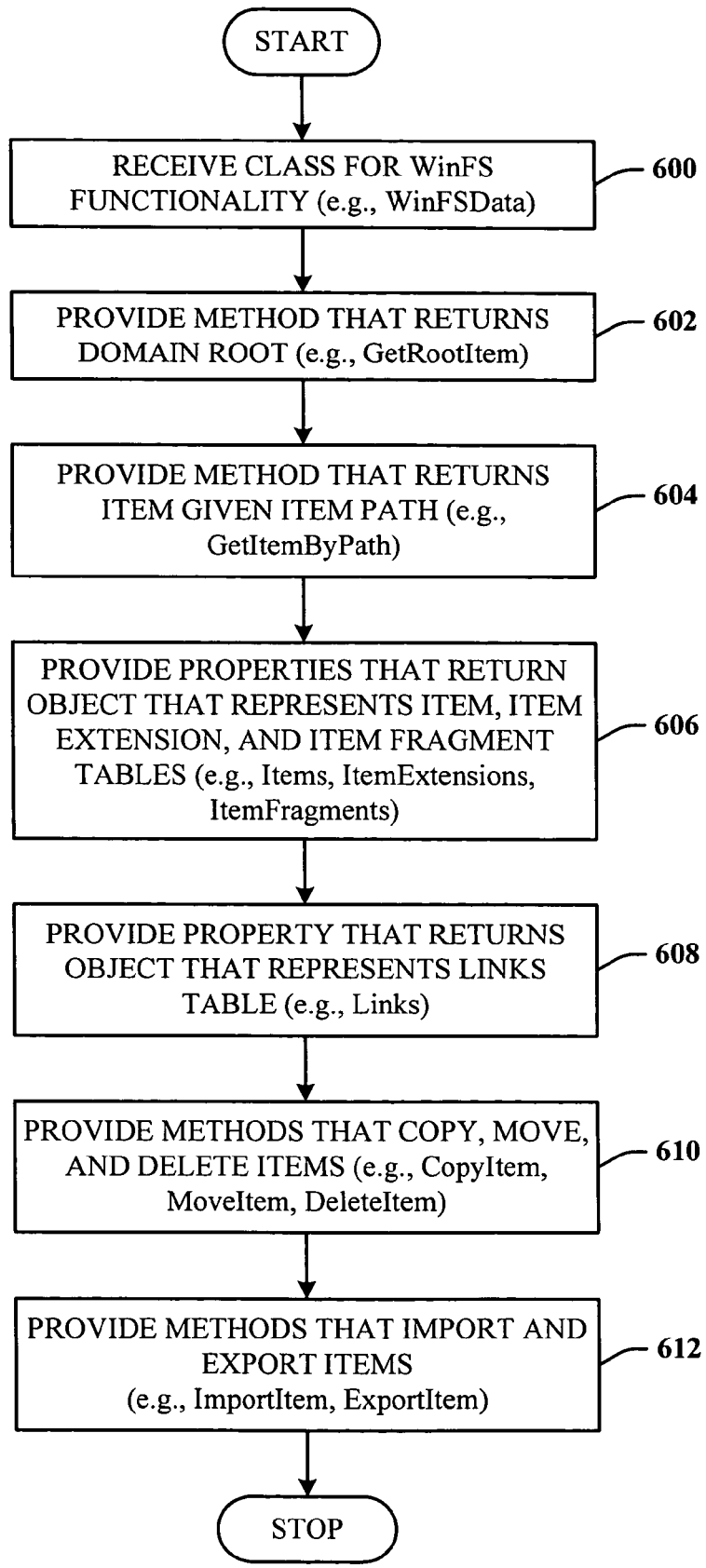
FIG. 6 illustrates a methodology of providing WinFS functionality in the API.

FIG. 6 illustrates a methodology of providing WinFS functionality in the API of the subject innovation. At 600, a class for WinFS functionality is employed. The WinFSData class can be derived from the TableSet class to provide WinFS specific functionality. The WinFSData class has the following members:

```
public partial WinFSData : TableSet {
    public WinFSData( StorageContext context );
    public WinFSData( StorageContext context, string tableSetName );
    public WinFSData( );
    public WinFSData( string share );
    public Item GetRootItem( ) { }
    public Item GetItemByPath( string path ) { }
    public Table<Item> Items { get { } }
    public Table<Link> Links { get { } }
    public Table<ItemExtension> ItemExtensions { get { } }
    public Table<ItemFragment> ItemFragments { get { } }
    // Copy methods
    public Ref<Item> CopyItem(string sourceItemName, string
        destinationItemName );
    public Ref<Item> CopyItem(string sourceItemName, string
        destinationItemName,
            CopyItemOptions options );
    public Ref<Item> CopyItem(string sourceItemName, string
        destinationItemName,
            StorageContext destinationContext,
        CopyItemOptions options );
    public Ref<Item> CopyItem( Ref<Item> sourceItemRef,
            Ref<Item> destinationContainerRef );
    public Ref<Item> CopyItem( Ref<Item> sourceItemRef,
            Ref<Item> destinationContainerRef,
        CopyItemOptions options);
    public Ref<Item> CopyItem( Ref<Item> sourceItemRef,
            Ref<Item> destinationContainerRef, string
        newNamespaceName,
            CopyItemOptions options);
    public Ref<Item> CopyItem( Item sourceItem, Item
        destinationContainer );
    public Ref<Item> CopyItem( Item sourceItem, Item
        destinationContainer,
            CopyItemOptions options);
    public Ref<Item> CopyItem( Item sourceItem, Item
        destinationContainer,
            string newNamespaceName, CopyItemOptions
        options);
    // Move Methods
    public void MoveItem( string sourceItemName, string
        destinationItemName );
    public void MoveItem( string sourceItemName, string
        destinationItemName,
            MoveItemOptions options );
    public void MoveItem( Ref<Item> sourceItemRef, Ref<Item>
        destinationContainerRef );
    public void MoveItem( Ref<Item> sourceItemRef, Ref<Item>
        destinationContainerRef,
            string newNamespaceName, MoveItemOptions
        options );
    public void MoveItem( Item sourceItem, Item destinationContainer
        );
    public void MoveItem( Item sourceItem, Item
        destinationContainer,
            string newNamespaceName, MoveItemOptions
        options );
    // Delete Methods
    public void DeleteItem ( string itemName );
    public void DeleteItem ( string itemName, ItemDeleteOptions
        options );
    public void DeleteItem ( Ref<Item> itemRef );
    public void DeleteItem ( Ref<Item> itemRef, ItemDeleteOptions
        options );
    public void DeleteItem ( Item item );
    public void DeleteItem ( Item item, ItemDeleteOptions options );
    // Export Methods
    public void ExportItem( string itemName, Stream stream );
    public void ExportItem( string itemName, string fileName );
    public void ExportItem( string itemName, string fileName,
            ExportItemOptions options );
    public void ExportItem( Ref<Item> itemRef, Stream stream );
    public void ExportItem( Ref<Item> itemRef, string fileName );
    public void ExportItem( Ref<Item> itemRef, string fileName,
            ExportItemOptions options );
    public void ExportItem( Item item, Stream stream );
    public void ExportItem( Item item, string fileName );
    public void ExportItem( Item item, string fileName,
            ExportItemOptions options );
    // Import Methods
    public void ImportItem( Stream stream, string itemName );
    public void ImportItem( string fileName, string itemName );
    public void ImportItem( string fileName, string itemName,
            ImportItemOptions options );
    public void ImportItem( Stream stream, Ref<Item>
        containerItemRef,
            string namespaceName );
    public void ImportItem( Stream stream, Ref<Item>
        containerItemRef,
            string namespaceName );
    public void ImportItem( string fileName, Ref<Item>
        containerItemRef,
            string namespaceName );
    public void ImportItem( string fileName, Ref<Item>
        containerItemRef,
            string namespaceName,
        ImportItemOptions options );
    public void ImportItem( Stream stream, Item containerItem,
        string uniuqeName );
    public void ImportItem( string fileName, Item containerItem,
        string namespaceName );
    public void ImportItem( string fileName, Item item, string
        name spaceName,
            ImportItemOptions options );
}
```

A WinFSData constructor can be constructed with an existing StorageContext, or may create a StorageContext using specified information (such as a UNC share) or default information (for example, the root of a default store). Additionally, a tableset Name can be specified to associate the WinFSData class with a particular named tableset instance.

At 602, a GetRootItem method can be provided to return the root of the domain. An asynchronous version of this method can also be provided. At 604, a GetItemByPath method can be provided in order to return an item given its path. An asynchronous version of this method can also be provided.

At 606, Items, ItemExtensions and ItemFragments properties can be provided to return objects representing Items, ItemExtensions, and ItemFragments tables. At 608, a Links property can be provided to return an object representing the Links table. At 610, methods are provided for copying, moving and deleting items. A CopyItem method can be provided to copy the specified item to another location within a store. A MoveItem method can be provided to move the specified item within a store. A DeleteItem method provides deletion of the specified item from a store. At 612, methods are provided for importing and exporting items. An ExportItem method can be provided to export the specified item from a store. An ImportItem method can be provided to import the specified item into a store. Asynchronous versions of the CopyItem method, MoveItem method, DeleteItem method, ExportItem method and ImportItem method can also be provided.

Figure 7:
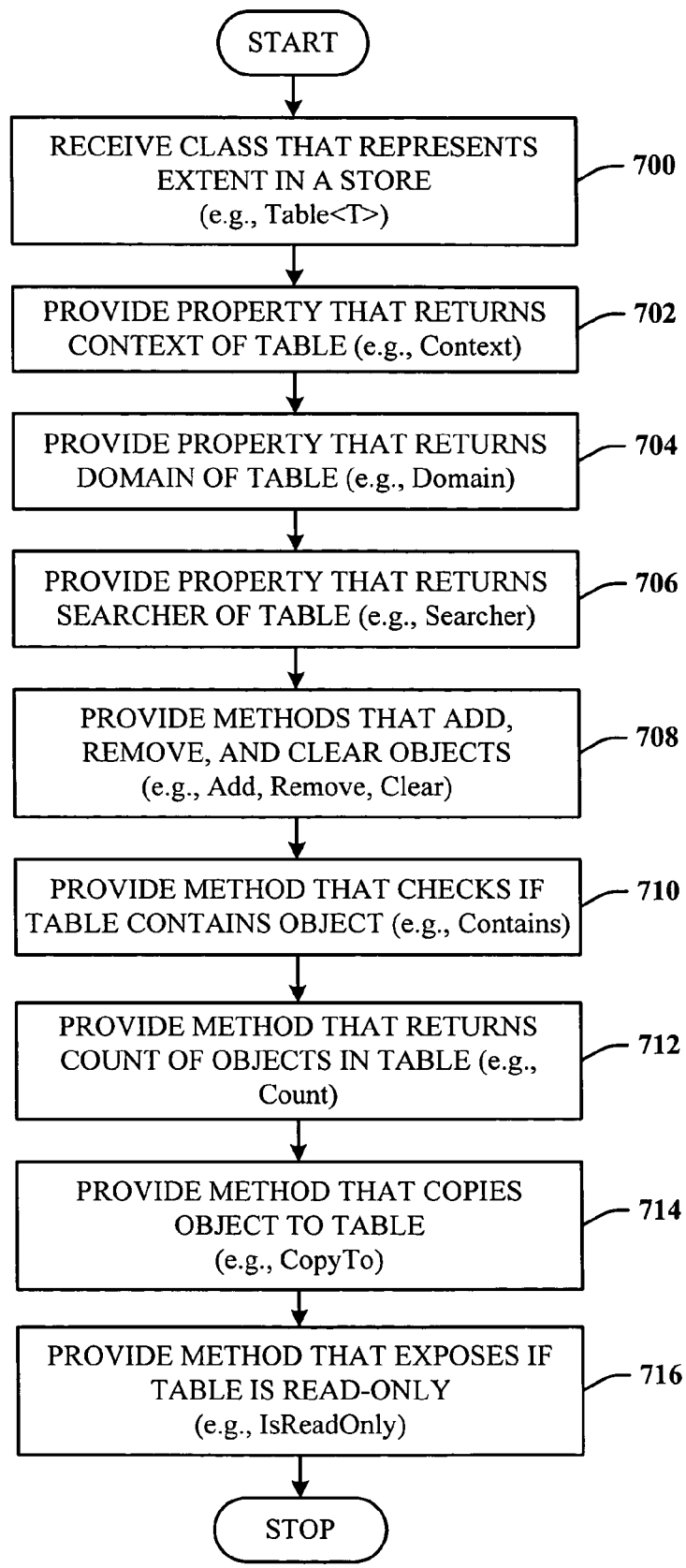
FIG. 7 illustrates a methodology of representing a class in a store.

FIG. 7 illustrates a methodology of representing a class in a store. At 700, a class is defined that represent an extent within a store. A Table<T> class is used to represent an extent within the store. The Table<T> class can have methods to add or remove objects to the extent, as well as build a StorageSearcher over the contents of the extent.

```
public class Table<T> {
    public Table(StorageContext context, string TableName);
    public Table(StorageDomain domain, string TableName);
    public StorageContext Context { get; internal set;}
    public StorageDomain Domain { get; internal set;}
    public StorageSearcher<T> Searcher { get; }
    // Support ICollection
    bool ICollection<T>.Add(T obj);
    void ICollection<T>.Remove(T obj);
    void ICollection<T>.Clear( );
    bool ICollection<T>.Contains(T t);
    public virtual int Count { get; }
    void ICollection<T>.CopyTo(T[ ] array, int arrayIndex);
    bool ICollection<T>.IsReadonly { get { }}
}
```

The Table<T> class can be constructed with information that specifies the StorageContext or StorageDomain, along with the name of the corresponding table in the schema. At 702, a Context property can be provided in order to return the StorageContext associated with the Table<T> class. At 704, a Domain property can be provided in order to return the StorageDomain associated with the Table<T> class. At 706, a Searcher property can be exposed in order to return a StorageSearcher against the corresponding table in the store. At 708, methods are provided for adding, removing, and clearing objects. An Add method can be exposed in order to add an object to the table. A Remove method can be exposed in order to specify an object to be removed from the table. A Clear method can be exposed in order to clear the table. At 710, a Contains method can be exposed in order to return whether or not the table contains a specified object. At 712, a Count method can be exposed in order to specify the total number of objects within the table. At 714, a method is provided that copies objects into a table. At 716, a property is provided that exposes if a table is read-only. A CopyTo method can be exposed in order to copy the specified objects into the table. An IsReadOnly property can be exposed in order to return whether or not the table can be added to or removed from.

Figure 8:
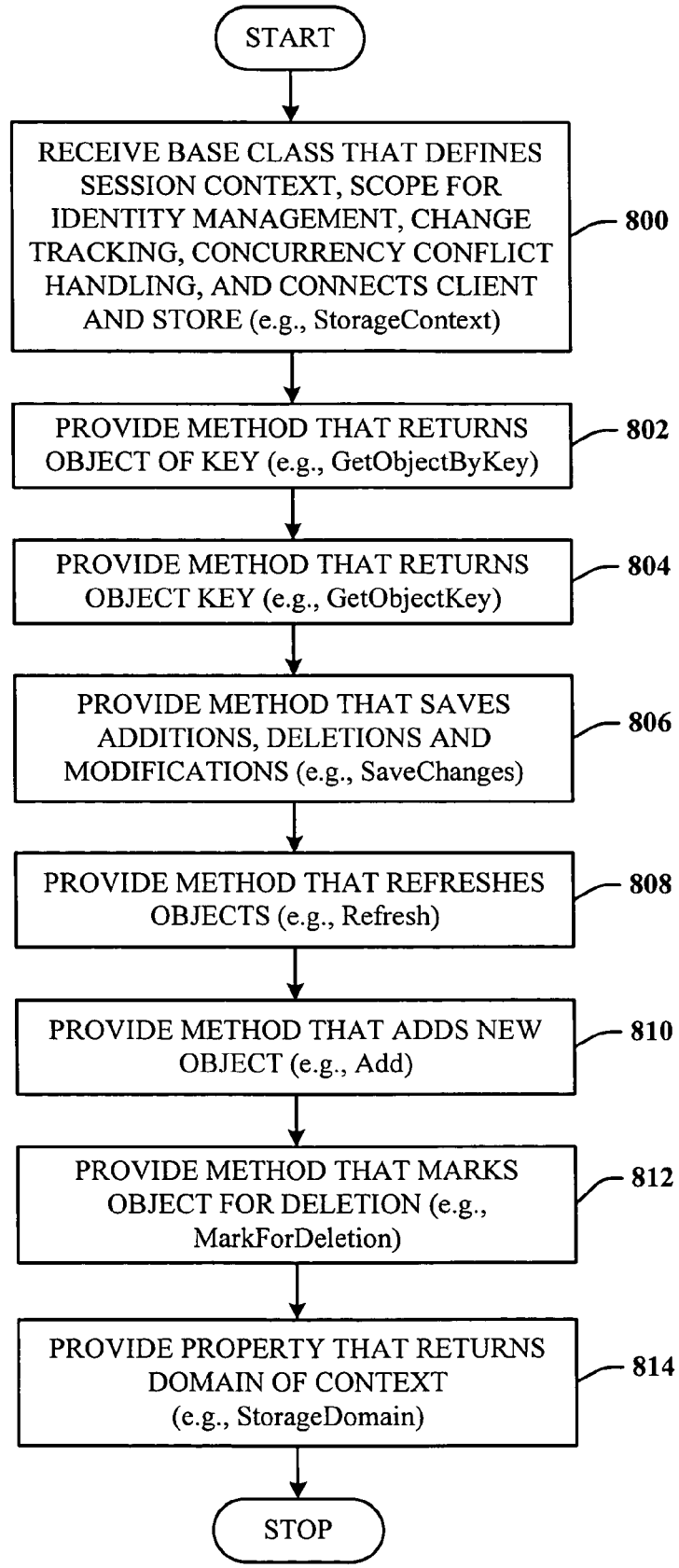
FIG. 8 illustrates a methodology of encapsulating a connection between a client and one or more stores.

FIG. 8 illustrates a methodology of encapsulating a connection between a client and one or more stores. Additionally, the class defines session context, scope for identity management, change tracking, and concurrency conflict handling. A StorageContext class encapsulates a connection between the client and one or more stores, and is the gateway for CRUD (Create, Read, Update, and Delete) operations.

```
public class StorageContext : IDisposable {
    public StorageContext( );
    public StorageContext(StorageDomain domain);
    public object GetObjectByKey(StorageKey key);
    public StorageKey GetObjectKey(object o);
    public void SaveChanges( );
    public void Refresh(RefreshMode options, IEnumerable<object>
        objects);
    public void Refresh(RefreshMode options, params object[ ] objects);
    public void Dispose( );
    public StorageDomain Domain { get; }
```

-continued

```
    public void Add(object o);
    public void MarkForDeletion(object o);
}
```

The StorageContext is constructed given a StorageDomain, which provides store information. Alternatively, a StorageContext can be constructed with no StorageDomain and obtain store information from a default source, such as a configuration file.

At 802, a method is provided that returns an object via a key. GetObjectByKey method can be provided to return the object within the StorageContext associated with a particular key. This method could alternatively be broken out into a separate StateManagement object. An asynchronous version of this method may also be provided. At 804, a GetObjectKey method can be provided to return the key associated with a particular object within the StorageContext. This method can alternatively be broken out into a separate StateManagement object. At 806, a SaveChanges method can be provided to save additions, deletions, or modifications to object within the StorageContext. An asynchronous version of this method may also be provided.

At 808, a Refresh method can be provided to refresh the objects within the StorageContext with the current store values. An explicit set of objects to refresh can be specified, for example through an enumerator or as parameters. Additional options can be specified to control how change conflicts are handled. An asynchronous version of this method can also be provided. At 810, an Add method can be provided to associate a new object with the StorageContext. This method could alternatively be broken out into a separate StateManagement object. At 812, a MarkForDeletion method can be provided to mark an object within the StorageContext to be deleted when SaveChanges is called. This method can alternatively be broken out into a separate StateManagement object. At 814, a StorageDomain property can be provided to return the StorageDomain associated with the StorageContext.

Figure 9:
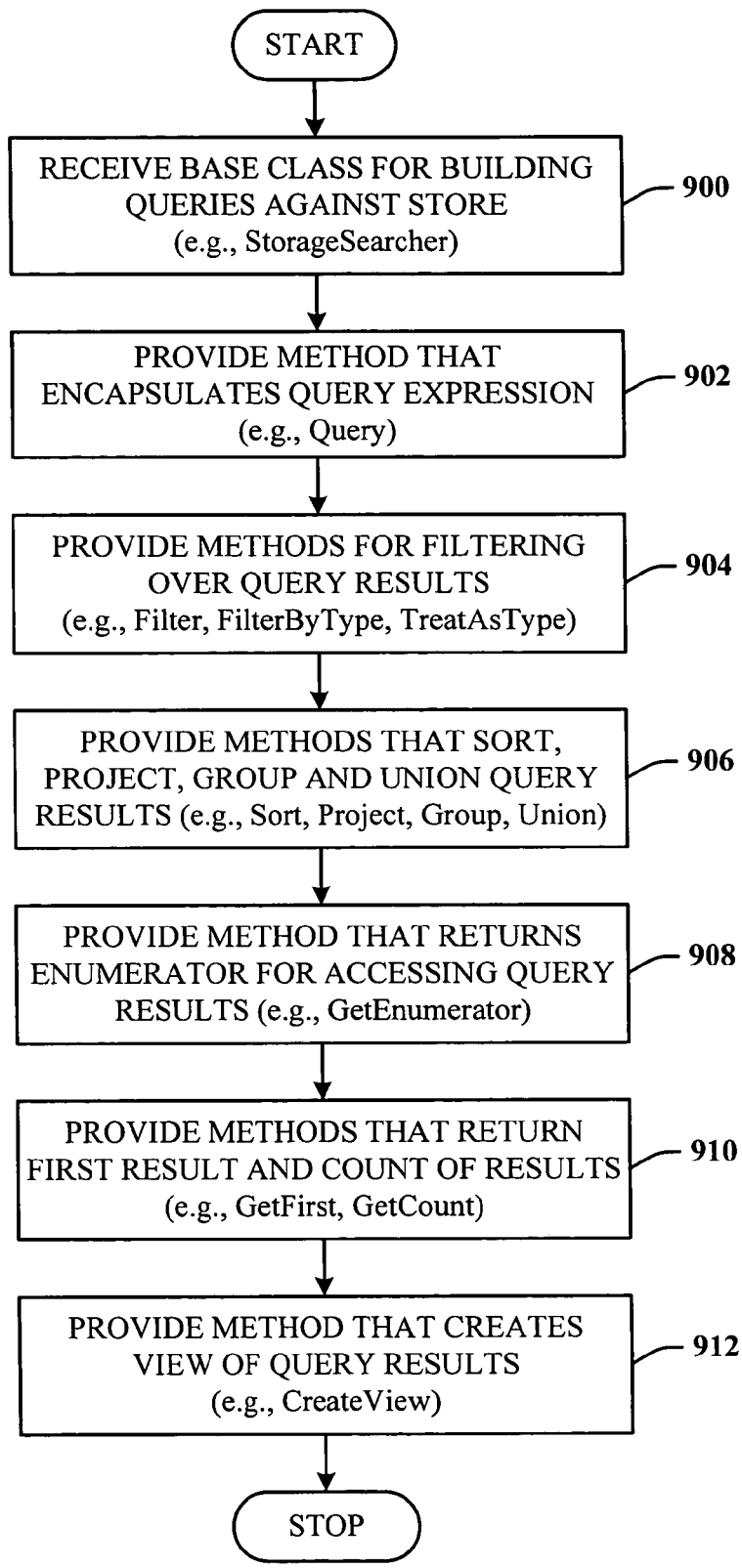
FIG. 9 illustrates a methodology of building queries against a store.

FIG. 9 illustrates a methodology of building queries against a store. At 900, a base class is defined for building queries against a store. StorageSearcher classes are used to build composable object-based queries against the store. The StorageSearcher generates a StorageExpression which is executed by a StorageDomain, typically within a StorageContext. The StorageSearcher supports enumerating results in a forward-only, streamed fashion, or construction of a rich, scrollable StorageView.

```
public class StorageSearcher<T> : IStorageSearcher, IEnumerable<T>
    where T : class
{
    public StorageSearcher(string expression);
    public StorageSearcher(string expression, object[ ] parameters);
    public StorageSearcher(string expression, object[ ] parameters,
        StorageContext context);
    public StorageSearcher(StorageExpression expression);
    public StorageSearcher(StorageExpression expression,
        StorageContext context);
    public StorageSearcher(string expression, object[ ] parameters,
        StorageDomain store);
    public StorageSearcher(StorageExpression expression,
        StorageDomain store);
    public StorageContext Context { get; }
    public StorageDomain Domain { get; }
    public StorageExpression Expression { get; }
    Type IStorageSearcher.ResultType { get; }
```

-continued

```
public StorageSearcher<T> BindContext(StorageContext context);
IStorageSearcher IStorageSearcher.BindContext(StorageContext
    context);
public StorageSearcher<T> BindParameters(IDictionary<string,
    object> parameters);
IStorageSearcher IStorageSearcher.BindParameters(IDictionary
    parameters);
public StorageSearcher<T> Filter(string expression, params
    object[ ] parameters);
public StorageSearcher<U> FilterByType<U>( ) where U : T;
public StorageSearcher<U> TreatAsType<U>( );
public StorageSearcher<T> Sort(string expression, params
    object[ ] parameters);
public StorageSearcher<StorageRecord> Project(string expression,
    params object[ ] parameters);
public StorageSearcher<StorageRecord> Group(string expression,
    params object[ ] parameters);
public StorageSearcher<T> Union(StorageSearcher<T> searcher);
public StorageSearcher<U> Query<U>(string expression, params
    object[ ] parameters);
public StorageSearcher<U> Query<U>(StorageExpression
    expression);
IStorageSearcher IStorageSearcher.Query(Type resultType,
    StorageExpression expression);
IStorageSearcher IStorageSearcher.Query(Type resultType, string
    expression,
        params object[ ] parameters);
public IEnumerator<T> GetEnumerator( );
IEnumerator IEnumerable.GetEnumerator( );
public T GetFirst( );
object IStorageSearcher.GetFirst( );
public int GetCount( );
public List<T> GetList( );
public StorageView<StorageViewRecord> CreateView( );
public StorageView<StorageViewRecord>
    CreateView(StorageViewDefinition definition);
public StorageView<StorageViewRecord> CreateView(
    StorageViewDefinition definition, StorageViewOptions options);
public StorageView<T> CreateView<T> (StorageViewDefinition
    definition, StorageViewOptions options) where T :
    StorageViewRecord { }
}
```

A StorageSearcher can be constructed with a StorageContext or StorageDomain to specify the context or store to which the StorageSearcher is bound. Additionally, a query expression can be specified to initialize a StorageSearcher, either as a string or StorageExpression object tree.

At 902, a Query method can be provided to construct a new StorageSearcher that encapsulates an arbitrary query expression. At 904, filter methods are provided. A Filter method can be provided to construct a new StorageSearcher that encapsulates a filter over the query results that would be produced by the input searcher. A FilterByType method can be provided to construct a new StorageSearcher that encapsulates a filter over the query results that would be produced by the input searcher. A TreatAsType method can be provided to construct a new StorageSearcher that treats the query results that would be produced by the input searcher as a different type.

At 906, Sort, Project, Group, and Union methods are provided. A Sort method can be provided to construct a new StorageSearcher that encapsulates a sort of the query results that would be produced by the input searcher. A Project method can be provided to construct a new StorageSearcher that encapsulates a projection of the query results that would be produced by the input searcher. A Group method can be provided to construct a new StorageSearcher that encapsulates a grouping of the query results that would be produced by the input searcher. A Union method can be provided to construct a new StorageSearcher that encapsulates the union of the query results that would be produced by two input searchers. The above are only examples and are not to be construed as limiting. Additional methods can be provided on the StorageSearcher to represent additional query operations. In other words, query operations can be exposed as methods on the StorageSearcher class that returns new StorageSearchers.

At 908, a GetEnumerator method can be provided to return an enumerator that can be used to access query results. An asynchronous version of this method can also be provided. At 910, methods are provided that return a first result of a query. Asynchronous versions of these methods can also be provided. A GetFirst method can be provided to return the first result. An asynchronous version of this method can also be provided. GetCount method can be provided to return a count of the results. An asynchronous version of this method can also be provided. At 912, CreateView method can be provide to create a StorageView from the StorageSearcher query. The CreateView method may take a StorageViewDefinition with or without additional options to specify information specific to the view.

The StorageRecord class is used as the result type of a searcher when the query will return data that doesn't correspond to any particular application defined type. For example, the result of a Project or Group operation is a collection of StorageRecord objects.

```
// StorageRecord represents a value in a structurally typed query
    result.
public class StorageRecord :
    System.ComponentModel.ICustomTypeDescriptor
{
    // Gets the value of a field
    public object this[string name] { get; }
}
```

Figure 10:
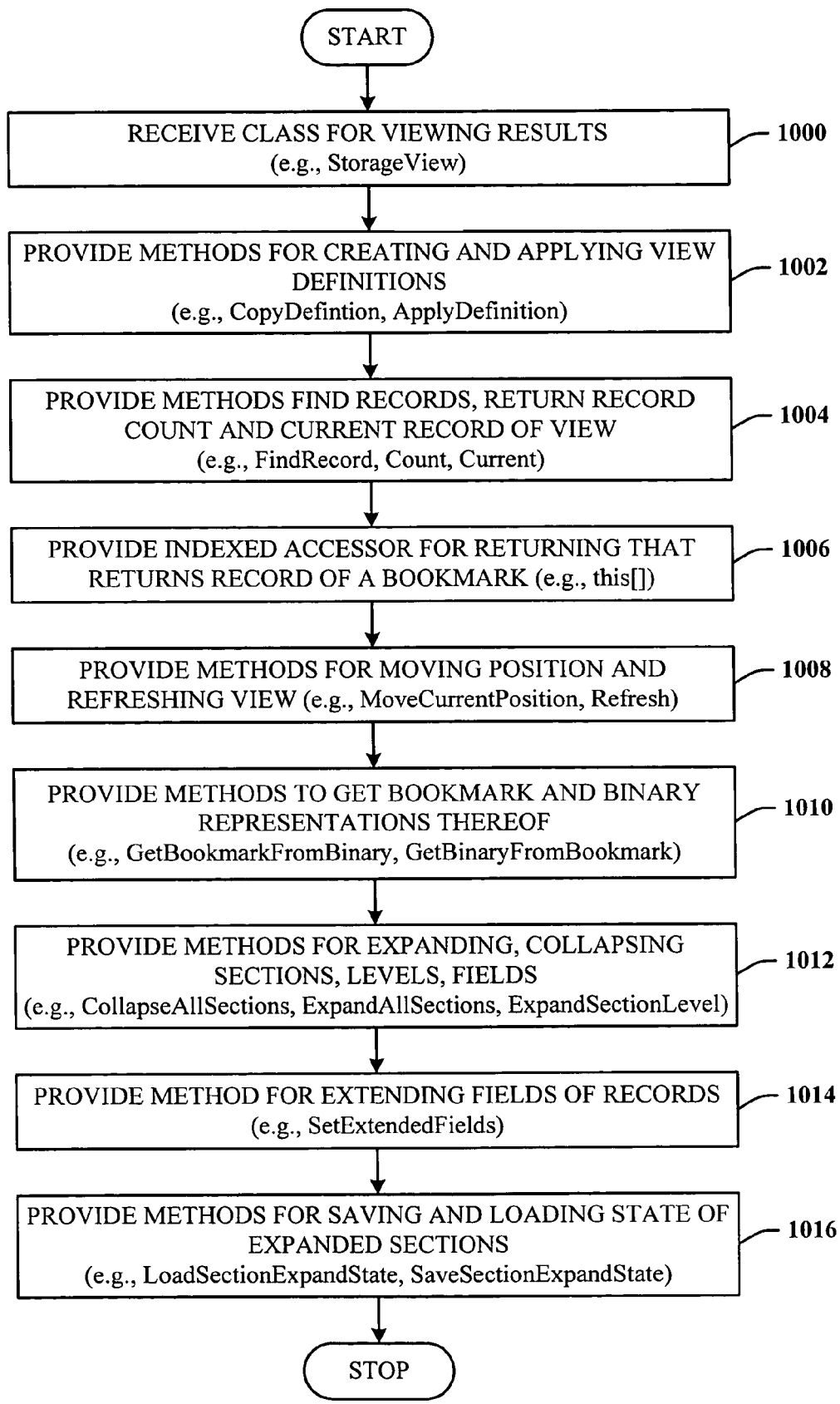
FIG. 10 illustrates a methodology of viewing over a set of results.

FIG. 10 illustrates a methodology of viewing over a set of results. At 1000, a class is provided for viewing results. The StorageView class provides a rich application view over a set of results. StorageViews support operations such as filtering, sorting, scrolling, grouping, sectioning, expanding/collapsing sections, etc.

```
sealed public class StorageView<T> : IVirtualList,
    IServiceContainer, IEnumerable, IListSource, IDisposable
    where T: StorageViewRecord
{
    public StorageViewDefinition CopyDefinition( ) { }
    public void ApplyDefinition(StorageViewDefinition definition) {
    }
    public int Count { get;}
    public T Current { get;}
    public T this[ViewRecordBookmark bookmark] {get;}
    public T FindRecord(ViewRecordBookmark bookmark, bool forward,
        string expression, params object[ ] parameters) { }
    public T FindRecord(StorageViewSeekOrigin seekOrigin, bool
        forward, string expression, params object[ ] parameters) { }
    public void MoveCurrentPosition(StorageViewSeekOrigin
        seekOrigin, int offset);
    public void MoveCurrentPosition(ViewRecordBookmark bookmark, int
        offset);
    public void Refresh( ) { }
    public ViewRecordBookmark GetBookmarkFromBinary(byte[ ]
        bookmark) { }
    public byte[ ] GetBinaryFromBookmark(ViewRecordBookmark
        bookmark) { }
    public void CollapseSection(params object[ ] sectionValues){ }
    public void CollapseSection(ViewRecordBookmark bookmark){ }
    public void ExpandSection(params object[ ] sectionValues){ }
    public void ExpandSection(ViewRecordBookmark bookmark){ }
    public void CollapseAllSections( ) { }
```

```
-continued public void ExpandAllSections( ) { }
public void ExpandSectionLevel(int sectionLevel){ }
public void LoadSectionExpandState(System.Xml.XmlReader reader);
public void SaveSectionExpandState(System.Xml.XmlWriter writer);
public void SetExtendedFields(StorageViewRecord[ ] records,
    string fields);
public IList IListSource.GetList( );
public event ViewChangedEventHandler ViewChanged;
}
```

At 1002, a CopyDefinition method can be provided to create a new instance of the StorageViewDefinition. An ApplyDefinition method can be provided to apply the specified StorageViewDefinition to the current StorageView. An asynchronous version of this method may also be provided. At 1004, methods are provided for finding records, returning record counts, and a current record. A FindRecord method can be provided to find a StorageViewRecord within the current StorageView according to the specified filter, relative to a specified position or bookmark. An asynchronous version of this method may also be provided. A Count method can be provided to return the number of records within the current StorageView. An asynchronous version of this method may also be provided. A Current method can be provided in order to return the current StorageViewRecord within the StorageView.

At 1006, an indexed accessor (e.g., this[ ]) can be provided in order to return the StorageViewRecord for a given Bookmark. An asynchronous version of this method may also be provided. At 1008, methods are provided for moving position and refreshing a view. A MoveCurrentPosition method can be provided in order to move the current position within the StorageView according to a specified position or bookmark and offset. An asynchronous version of this method may also be provided. A Refresh method can be provided in order to refresh the data within a static StorageView with the current values from the store. An asynchronous version of this method may also be provided. At 1010, methods are provided to get bookmarks and binary representation thereof. A GetBookmarkFromBinary method can be provided in order to get a bookmark from a persistent binary representation. A GetBinaryFromBookmark method can be provided in order to get a persistent binary representation from a Bookmark.

At 1012, methods are provided for expanding, collapsing sections, levels and fields. A CollapseAllSections method can be provided in order to collapse all sections defined within the StorageView. An asynchronous version of this method may also be provided. An ExpandAllSections method can be provided in order to expand all sections defined within the StorageView. An asynchronous version of this method may also be provided. An ExpandSectionLevel method can be provided in order to expand all sections up to and including the specified level. An asynchronous version of this method may also be provided.

At 1014, a method is provided for extending fields of records. A SetExtendedFields method can be provided in order to define extended fields associated with a set of StorageViewRecords. At 1016, methods are provided for saving and loading state of expanded sections. A LoadSectionExpandState method can be provided to load the state specifying the set of sections that are expanded. An asynchronous version of this method may also be provided. A SaveSectionExpandState method can be provided in order to save the state specifying the set of sections that are expanded. The StorageView may expose a ViewChanged event for notifying the listener when the StorageView has changed.

Figure 11:
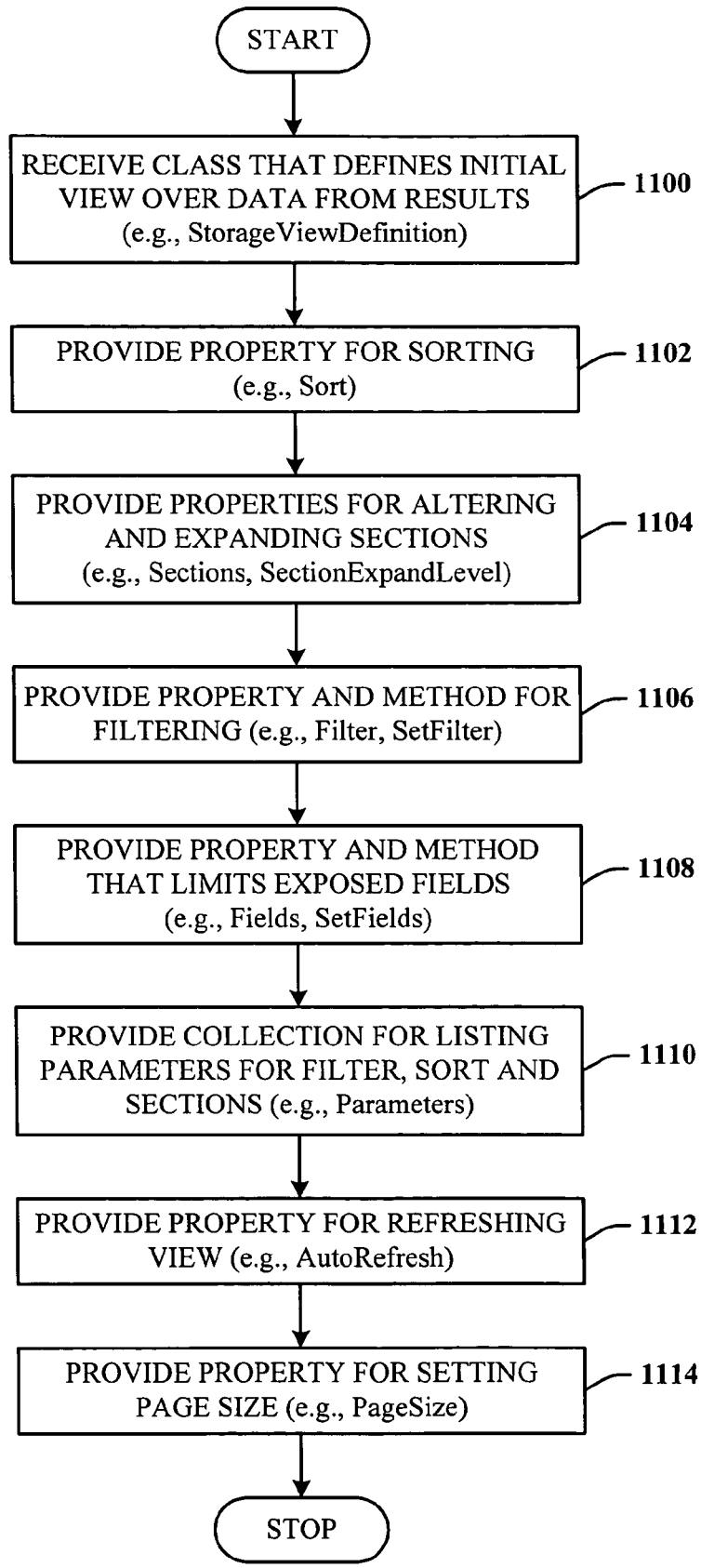
FIG. 11 illustrates a methodology of presenting an initial view of data over results.

FIG. 11 illustrates a methodology of presenting an initial view of data over results. At 1100, a class is provided that defines the initial view of the data. A StorageViewDefinition class defines the initial view of data over the results defined by a StorageSearcher.

```
public class StorageViewDefinition
{
    public string Sort { get; set;}
    public IList<StorageViewSection> Sections { get;}
    public int SectionExpandLevel { get; set; }
    public string Filter { get; set;}
    public void SetFilter(string expression, params object[ ]
        parameters);
    public string Fields { get; set;}
    public void SetFields(string expression, params object[ ]
        parameters);
    public IDictionary<string,object> Parameters { get;}
    public bool AutoRefresh { get; set; }
    public int PageSize { get; set;}
}
```

At 1102, a Sort property can be provided to get or set the sort criteria for the StorageView. At 1104, properties are provided for altering and expanding sections. A Sections property can be provided in order to alter the list of Sections defined within the StorageView. A SectionExpandLevel property can be provided in order to expand the sections up to and including the specified level. At 1106, a property and a method are provided for filtering operations. A Filter property can be exposed in order to filter the StorageView to expose only those StorageViewRecords matching the specified filter condition. A SetFilter method can be exposed in order to filter the StorageView to expose only those StorageViewRecords matching the specified filter condition using the specified parameters. At 1108, a property and a method are provided that limit exposed fields. A Fields property can be exposed in order to limit the fields exposed by the StorageView to those Fields specified. A Fields method can be exposed in order to limit the fields exposed by the StorageView to those Fields specified using the specified parameters.

At 1110, a collection is provided that lists parameters utilized by filter, sort, and sections. A Parameters collection can be exposed listing the parameters used by the filter, sort, and sections specifications. At 1112, a Boolean AutoRefresh property can be exposed in order to specify whether or not the StorageView is automatically kept in sync with changes to the store. At 1114, a PageSize property can be exposed in order specify the number of StorageViewRecords to be retrieved at a time from the store.

Figure 12:
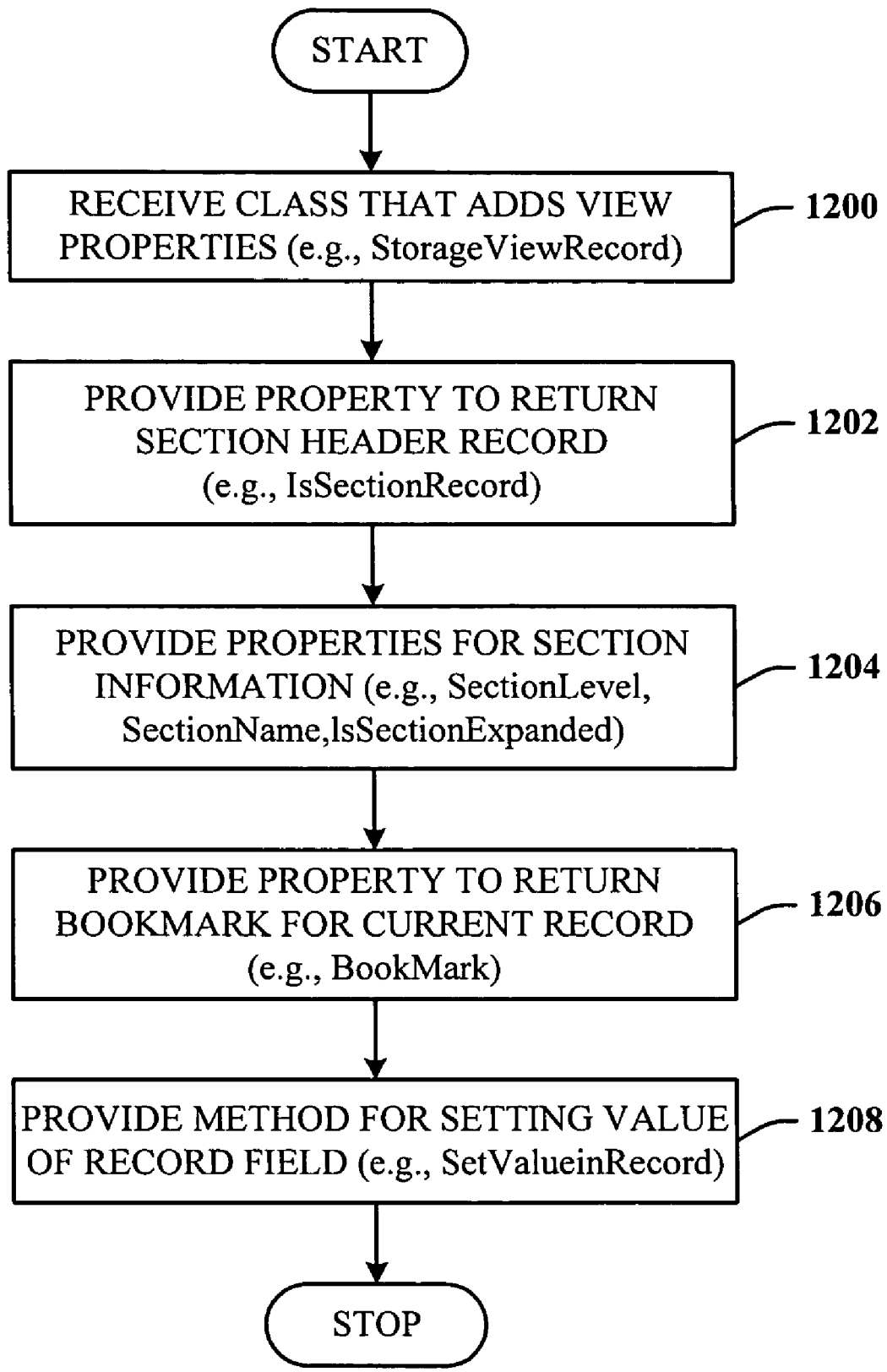
FIG. 12 illustrates a methodology of extending a storage record class.

FIG. 12 illustrates a methodology of extending a storage record class. At 1200, a class is provided that adds view properties. A StorageViewRecord extends StorageRecord, adding StorageView specific properties such as sectioning information, bookmarks, and field setters. StorageViewRecords support IPropertyChange to notify listeners when values within the StorageViewRecord are changed.

```
public class StorageViewRecord : StorageRecord, IPropertyChange
{
    public virtual bool IsSectionRecord { get; }
    public virtual int SectionLevel { get; }
    public virtual string SectionName { get; }
    public virtual bool IsSectionExpanded { get; }
```

```
public virtual ViewRecordBookmark Bookmark { get; }
protected virtual void SetValueinRecord(int i, object value);
protected virtual void SetValueinRecord(string name, object
    value);
}
```

At 1202, an IsSectionRecord property can be exposed in order to return whether or not the StorageViewRecord represents a section header record in the StorageView. At 1204, properties are provided for section information. A Section-Level property can be exposed in order to return the level of the StorageViewRecord within the StorageView. A Section-Name property can be exposed in order to return the name of the section within the StorageView. An IsSectionExpanded property can be exposed in order to return whether or not the section is expanded. At 1206, a Bookmark property can be exposed in order to return a bookmark for the current StorageViewRecord. At 1208, a SetValueinRecord method can be exposed in order to set the value of the specified field within the StorageViewRecord. The field can be specified by name or by ordinal.

A StorageViewSection is used to define a section (group) within a StorageView.

```
public class StorageViewSection
{
    public StorageViewSection(string field) { }
    public string Field { get; }
    public string AggregateFields { get; set; }
    public string Sort { get; set; }
    public string Having { get; set; }
    public void SetHaving(string expression, params object[ ]
        parameters);
}
```

The StorageViewSection can be constructed specifying the field within a StorageView on which the section is being defined. A Field property can be exposed to return the field within the StorageView on which the section is defined. An AggregateFields property can be exposed in order to get or set the aggregates to calculate for the section. A Sort property can be exposed in order to specify an ordering for the StorageViewRecords within the section. A Having property can be exposed in order to restrict the StorageViewRecords according to the Aggregate fields specified. A SetHaving method can be exposed in order to restrict the StorageViewRecords according to the Aggregate fields specified along with a set of parameters.

A StorageCollection<T> class is used to represent a strongly typed collection of objects whose population can be deferred. For example, a StorageCollection can be used in a collection property of a parent object. The StorageCollection can be populated explicitly or implicitly when its content is accessed.

```
public class StorageCollection<T> : ICollection<T>, IBindingList,
    ITypedList {
    public StorageCollection( );
    public StorageCollection(object parent, StorageContext ctx,
        string role);
    public StorageContext Context { get; internal set;}
    public StorageDomain Domain { get; internal set;}
    public void Fill( );
    public void Fill(StorageSearcher<T> searcher);
    public void Fill(IEnumerable<T> values);
    public bool IsFilled { get;}
    public void Reset( );
    public StorageSearcher<T> Searcher { get; }
    public IEnumerator<T> GetEnumerator( );
    // Support for ICollection
    bool ICollection<T>.Add(T obj);
    void ICollection<T>.Remove(T obj);
    void ICollection<T>.Clear( );
    bool ICollection<T>.Contains(T t);
    public virtual int Count { get; }
    void ICollection<T>.CopyTo(T[ ] array, int arrayIndex);
    bool ICollection<T>.IsReadOnly { get { } }
}
```

The StorageCollection can be constructed with information specifying the StorageContext or StorageDomain, parent object, and role associated with the StorageCollection, for example if the StorageCollection represents the objects within a collection property of a parent object.

A Context property can be provided in order to return the StorageContext associated with the StorageCollection. A Domain property can be provided in order to return the StorageDomain associated with the StorageCollection. A Fill method can be provided in order to add objects to the collection. The fill method can take an IEnumerable<T> or a StorageSearcher, or can use the parent and role properties, along with a StorageDomain or StorageContext, in order to generate a request to populate the StorageCollection. An IsFilled property can be exposed in order to return whether or not the StorageCollection has been populated. A Reset method can be exposed in order to reset the StorageCollection.

A Searcher property can be exposed in order to return a StorageSearcher against the store corresponding to definition of the collection. A GetEnumerator method can be exposed in order to return an enumerator over the contents of the StorageCollection. An Add method can be exposed in order to add an object to the StorageCollection. A Remove method can be exposed in order to remove an object from the StorageCollection. A Clear method can be exposed in order to clear the StorageCollection. A Contains method can be exposed in order to return whether or not the StorageCollection contains a specified object instance. A Count method can be exposed in order to specify the total number of objects within the StorageCollection. A CopyTo method can be exposed in order to copy the specified objects into the StorageCollection. An IsReadOnly property can be exposed in order to return whether or not the StorageCollection can be added to or removed from.

Figure 13:
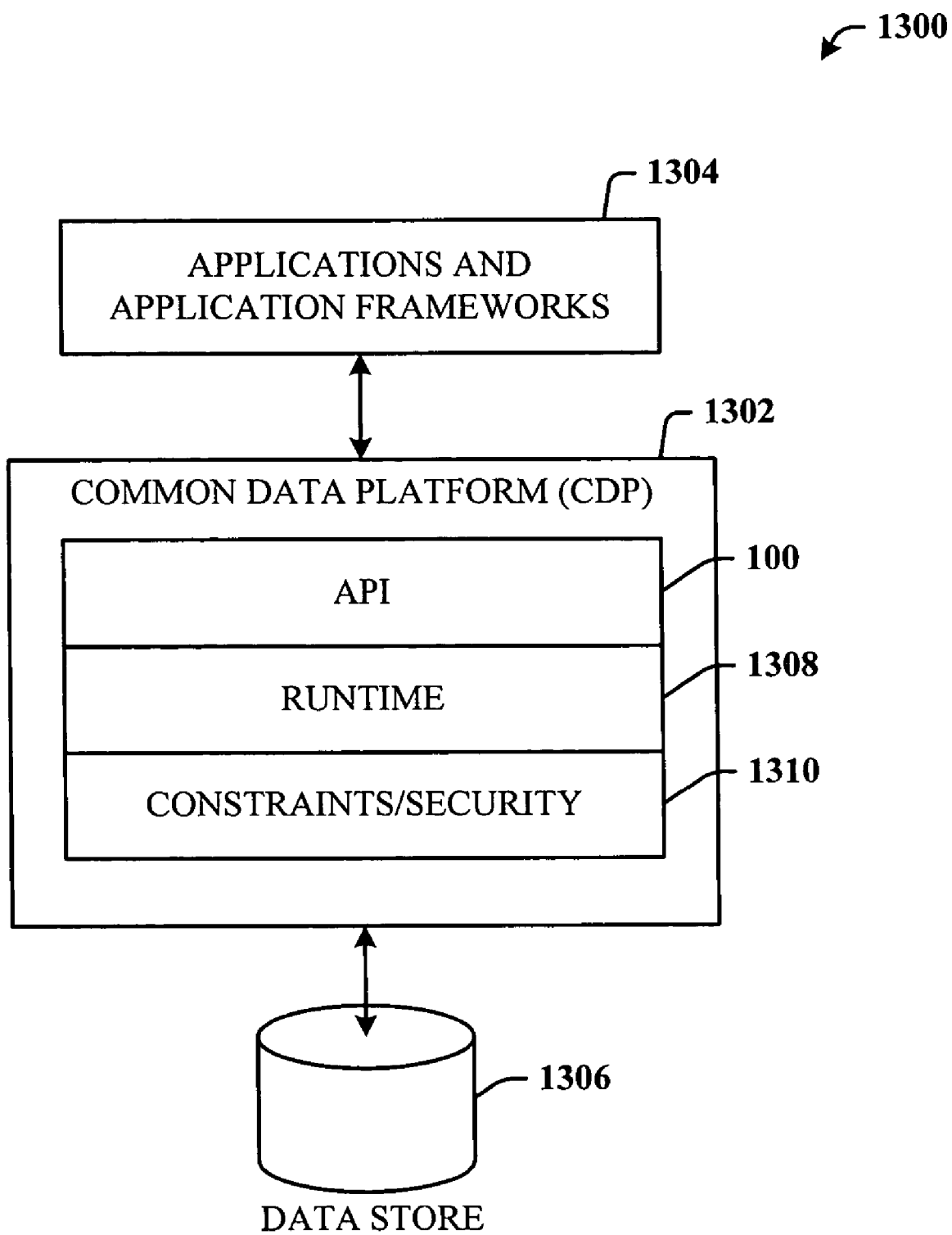
FIG. 13 illustrates a system that employs the storage API for a common data platform.

FIG. 13 illustrates a system 1300 that employs the storage API 100 for a CDP 1302. The CDP 1302 is employed to provide data management between data applications and application frameworks 1304 and data on a data store 1306. The CDP 1302 provides data services which are common across the application frameworks and end-user applications associated therewith. The CDP 1302 further includes the API 100 that facilitates interfacing with the applications and application frameworks 1304, a runtime component 1308, and a constraint/security engine component 1310. The API 100 provides the programming interface for applications using the CDP 1302 in the form of public classes, interfaces, and static helper functions. Examples include StorageContext, StorageSearcher, Entity, Entity, TableSet, Table, EntityReference, and TableReference.

The CDP runtime component 1308 is a layer that implements the various features exposed in the public API layer 100. It implements the common data model by providing object-relational mapping and query mapping, enforcing data model constraints, etc. More specifically, the CDP runtime 1308 includes: a common data model component implementation; a query processor component; a sessions and transactions component; an object cache, which can include a session cache and an explicit cache; a services component that includes change tracking, conflict detection, and eventing; a cursors and rules component; a business logic hosting component; and a persistence and query engine, which provides the core persistence and query services. Internal to persistence and query services are the object-relational mappings, including query/update mappings. The CDP 1302 also includes the constraint/security engine 1310 which provides for applying constraints against the data store 1306 and security policies, for example, role-based security.

Figure 14:
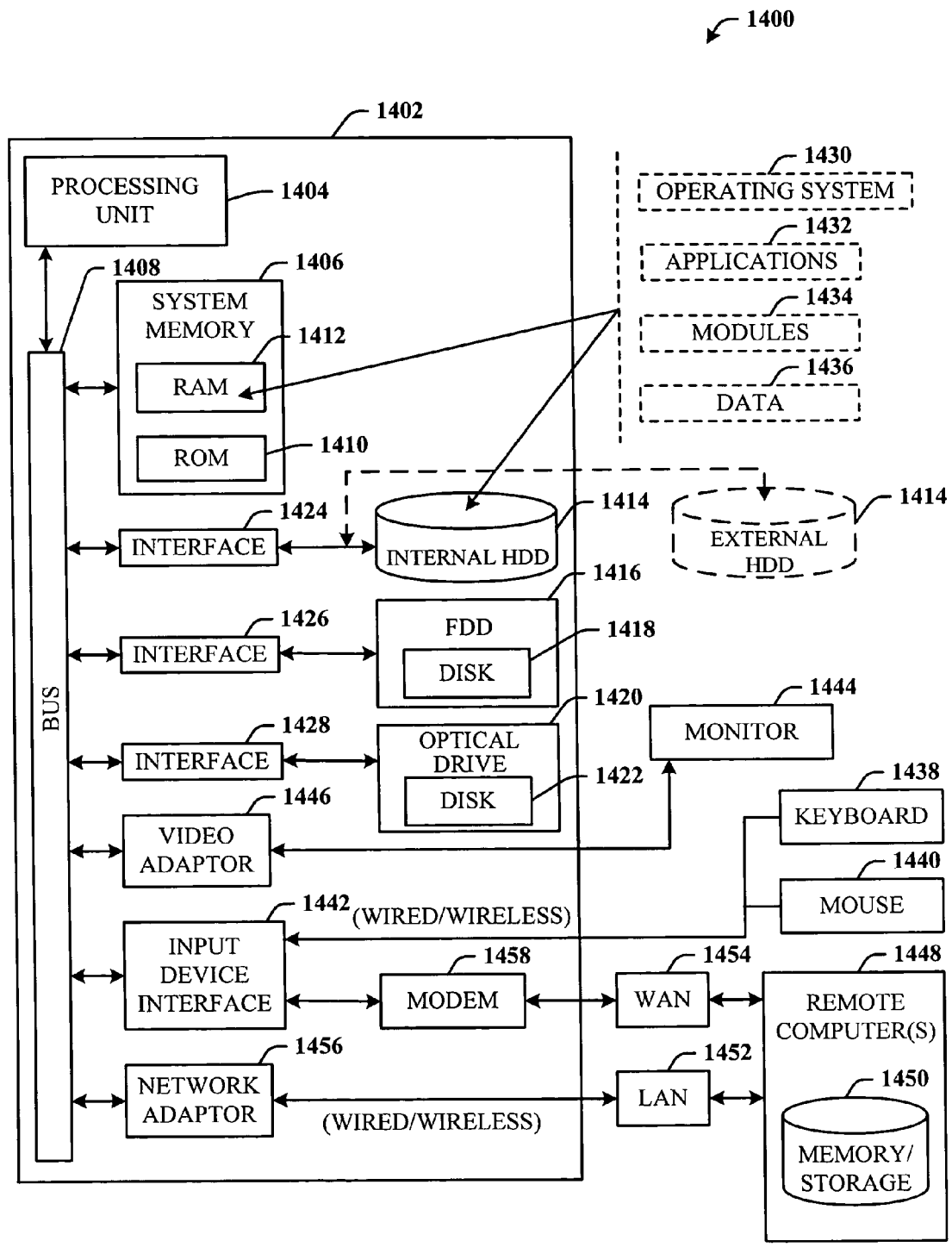
FIG. 14 illustrates a block diagram of a computer operable to execute the disclosed architecture.

Referring now to FIG. 14, there is illustrated a block diagram of a computer operable to execute the disclosed API architecture. In order to provide additional context for various aspects of the subject invention, FIG. 14 and the following discussion are intended to provide a brief, general description of a suitable computing environment 1400 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 14, the exemplary environment 1400 for implementing various aspects of the invention includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject invention.

The drives and their associated computer-readable media provide non-volatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the invention can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adaptor 1456 may facilitate wired or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 15:
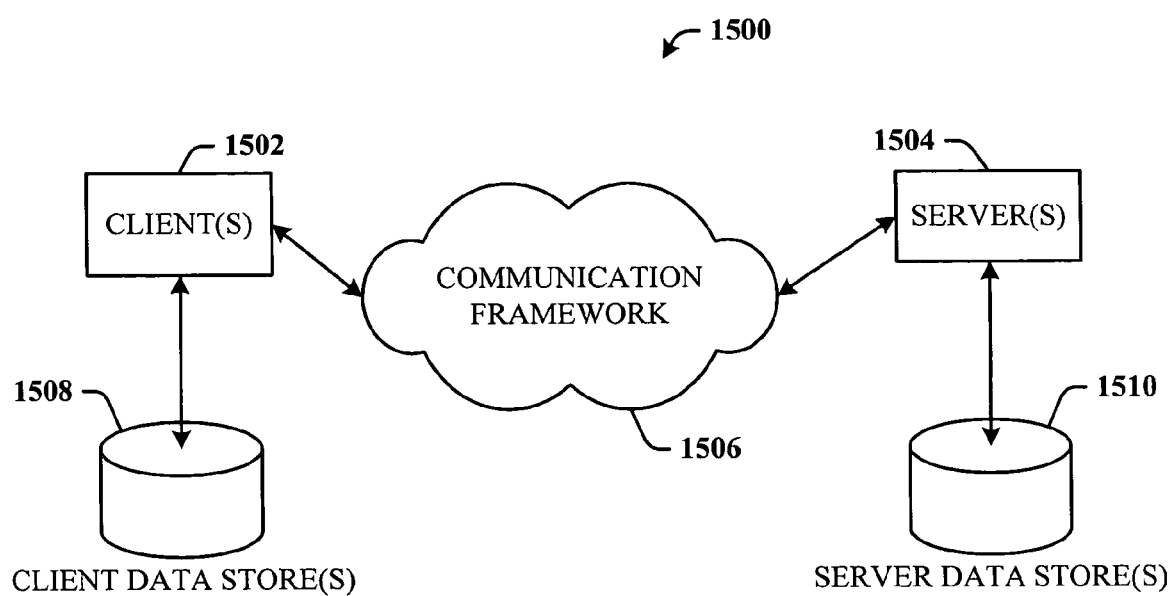
FIG. 15 illustrates a schematic block diagram of an exemplary computing environment.

Referring now to FIG. 15, there is illustrated a schematic block diagram of an exemplary computing environment 1500 in accordance with the subject invention. The system 1500 includes one or more client(s) 1502. The client(s) 1502 can be hardware and/or software (e.g., threads, processes, computing devices). The client(s) 1502 can house cookie(s) and/or associated contextual information by employing the invention, for example.

The system 1500 also includes one or more server(s) 1504. The server(s) 1504 can also be hardware and/or software (e.g., threads, processes, computing devices). The servers 1504 can house threads to perform transformations by employing the invention, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-readable storage medium for use in a computing system to provide an application programming interface for a data platform, the application programming interface allowing access to multiple information formats in a generic manner, and the computer-readable medium comprising:

one or more storage elements storing computer executable instructions, the computer-executable instructions including:
  a generic application programming interface (API) for a data platform, wherein the generic API includes:
    a generic data access component that exposes each of stores, sessions, transactions, and query services of the data platform, wherein the data platform is associated with a data store;
    a data classes component of canonical, application-independent classes that expose types and relationships of a data model of the data platform;
    a domain data classes component of application-specific and framework-specific classes that expose domain-specific properties and behaviors of the data platform, wherein a domain is different from an application;
    a schema class that provides access to tables of the schema, the schema class being derived from an untyped schema class;
    a TableSet class providing strongly typed access to tables defined within the schema;
    a StorageDomain class defining a store over which the rest of the classes in the API operate;
    a StorageContext class providing a context for a session, and defining the scope for at least one of identity management, change tracking or concurrency conflict handling, with methods for refreshing or saving chances to objects within a current context;
    a StorageSearcher class configured to build queries against the data store; and a StorageView class providing an application view over a set of results from a query.

2. The computer-readable storage medium of claim 1, wherein the data platform is a common data platform that interfaces to the data store to provide data services accessible by a plurality of disparate application frameworks, the data services allow a corresponding application of the different frameworks to access the data store.

3. The computer-readable storage medium of claim 1, wherein the domain data classes component includes a domain class that defines a store over which other classes operate.

4. The computer-readable storage medium of claim 1, wherein the data classes component includes a context class that provides a context for a session.

5. The computer-readable storage medium of claim 4, wherein the context class defines a scope for identity management, change tracking, and concurrency conflict handling, with methods for refreshing or saving changes to objects within a current context.

6. The computer-readable storage medium of claim 1, wherein the data classes component includes a searcher class employed to build a composable object-based query against the data store.

7. The computer-readable storage medium of claim 1, the generic API further comprising a view class that provides a view over a result set.

8. The computer-readable storage medium of claim 1, the generic API further comprising a schema class that provides access to tables of the schema.

9. The computer-readable storage medium of claim 8, wherein the schema class is a strongly typed schema class that is derived from an untyped schema class based on a target schema.

10. A computer-implemented method of using a generic application programming interface in exposing a data platform so as to provide access to information in a generic manner, regardless of the particular format of the information, comprising:
  at a computing system, using one or more processors in executing computer-executable instructions to perform the following:
    access a generic API, wherein the generic API includes components that, when executed by the one or more processors perform the following:
      expose each of stores, sessions, transactions, and query services of the data platform, wherein the data platform associated with a data store;
      expose types and relationships of a data model of the data platform, and using one or more canonical, application-independent classes; and
      expose domain-specific properties and behaviors of the data platform, and using one or more application-specific and framework-specific classes, in which a domain is different than an application;
      provide access to tables of the schema through a schema class, the schema class being derived from an untyped schema class;
      provide strongly typed access to tables defined within the schema, wherein access is provided through a TableSet class;
      use a StorageDomain class that defines a store over which the rest of the classes in the API operate;
      provide, using a StorageContext class, a context for a session, wherein the StorageContext class further defines the scope for at least one of identity management, chance tracking or concurrency conflict handling, with methods for refreshing or saving chances to objects within a current context;
      build queries against the data store using a StorageSearcher class; and provide an application view over a set of results from a query using a StorageView class.

11. The method of claim 10, further comprising encapsulating stores information of the stores, the stores information includes server information, authentication information and mapping information.

12. The method of claim 10, further comprising an act of building a storage view via a storage searcher.

13. The method of claim 10, further comprising an act of querying a storage domain via a storage searcher.

14. The method of claim 10, further comprising an act of providing a class that encapsulates a connection between a client and one or more of the stores.

15. The method of claim 10, wherein the act of exposing at least one of stores is via a generic data access component.

16. A computer storage medium for use with a computing system to provide an application programming interface for a data platform, the application programming interface providing access to a variety of different types of data objects in a generic manner, the computer-readable medium comprising:
  one or more storage elements storing computer executable instructions, the computer-executable instructions including:
    a generic application programming interface (API) for a data platform, wherein the generic API includes:
      a generic data access component that exposes each of stores, sessions, transactions, and query services of the data platform, wherein the data platform is associated with a data store;

a data classes component of canonical, application-independent classes that expose types and relationships of a data model of the data platform;

a domain data classes component of application-specific and framework-specific classes that expose domain-specific properties and behaviors of the data platform, wherein a domain is different from an application;

a schema class that provides access to tables of the schema, and in which the schema class is a strongly typed schema class that is derived from an untyped schema class based on a target schema.

a TableSet class generated from a data model schema and providing strongly typed access to tables defined within the schema;

a StorageDomain class defining a store over which the rest of the classes in the API operate;

a StorageContext class providing a context for a session, and defining the scope for identity management, change tracking and concurrency conflict handling, with methods for refreshing or saving changes to objects within a current context;

a StorageSearcher class configured to build composable object-based queries against the data store; and a StorageView class providing an application view over a set of results from a query, and supporting filtering, sorting, scrolling, grouping, sectioning, expanding, and collapsing of sections.

* * * * *